United States Patent
Shigemori et al.

(10) Patent No.: US 9,732,240 B2
(45) Date of Patent: Aug. 15, 2017

(54) INKJET PIGMENT INK

(75) Inventors: Kazunori Shigemori, Tokyo (JP); Natsuko Kokubo, Tokyo (JP); Joji Mikami, Tokyo (JP); Masayoshi Utsugi, Tokyo (JP); Yasutaka Itimura, Tokyo (JP); Satoshi Washio, Tokyo (JP); Yukitoshi Takahashi, Tokyo (JP); Atsushi Yoda, Tokyo (JP); Masahiro Sugihara, Tokyo (JP)

(73) Assignees: TOYO INK SC HOLDINGS CO., LTD., Tokyo (JP); TOYO INK CO., LTD., Tokyo (JP)

( * ) Notice: Subject to any disclaimer, the term of this patent is extended or adjusted under 35 U.S.C. 154(b) by 0 days.

(21) Appl. No.: 14/004,525

(22) PCT Filed: Mar. 9, 2012

(86) PCT No.: PCT/JP2012/056199
§ 371 (c)(1),
(2), (4) Date: Nov. 11, 2013

(87) PCT Pub. No.: WO2012/124643
PCT Pub. Date: Sep. 20, 2012

(65) Prior Publication Data
US 2014/0066550 A1   Mar. 6, 2014

(30) Foreign Application Priority Data

Mar. 11, 2011  (JP) .................. 2011-054366
Mar. 11, 2011  (JP) .................. 2011-054367
Mar. 23, 2011  (JP) .................. 2011-064821

(51) Int. Cl.
C09D 11/30    (2014.01)
C09D 11/326   (2014.01)
C09D 11/106   (2014.01)
C09D 11/322   (2014.01)

(52) U.S. Cl.
CPC ............ *C09D 11/30* (2013.01); *C09D 11/106* (2013.01); *C09D 11/322* (2013.01); *C09D 11/326* (2013.01)

(58) Field of Classification Search
CPC .................................................. C09D 11/00
USPC .......................................................... 524/90
See application file for complete search history.

(56) References Cited

U.S. PATENT DOCUMENTS

| | | | |
|---|---|---|---|
| 5,184,148 A | 2/1993 | Suga et al. | |
| 6,547,382 B1 * | 4/2003 | Shirota et al. ................ | 347/100 |
| 2001/0032566 A1 * | 10/2001 | Yatake .................. | C09D 11/38 |
| | | | 106/31.58 |
| 2002/0077384 A1 * | 6/2002 | Sano et al. .................... | 523/160 |
| 2003/0071883 A1 | 4/2003 | Suzuki et al. | |
| 2005/0004261 A1 | 1/2005 | Yatake | |
| 2006/0192827 A1 | 8/2006 | Takada et al. | |
| 2009/0170989 A1 | 7/2009 | Steele et al. | |
| 2009/0263632 A1 | 10/2009 | Kojima et al. | |
| 2010/0196601 A1 | 8/2010 | Goto et al. | |
| 2010/0247874 A1 | 9/2010 | Ishihara et al. | |
| 2011/0030580 A1 * | 2/2011 | Jackson ................. | C09D 11/40 |
| | | | 106/31.6 |

FOREIGN PATENT DOCUMENTS

| | | |
|---|---|---|
| CN | 101321835 A | 12/2008 |
| EP | 1707606 A1 | 10/2006 |
| EP | 1783182 A1 | 5/2007 |
| JP | 64-006074 A | 1/1989 |
| JP | 64-031881 A | 2/1989 |
| JP | 03-210373 A | 9/1991 |
| JP | 08-060050 A | 3/1996 |
| JP | 08-209046 A | 8/1996 |
| JP | 10-077431 A | 3/1998 |
| JP | 2003-055590 A | 2/2003 |
| JP | 2003-138170 A | 5/2003 |
| JP | 2003-176431 A | 6/2003 |
| JP | 2003-292838   * | 10/2003 |
| JP | 2004-175975 A | 6/2004 |
| JP | 2004-269797 A | 9/2004 |
| JP | 2005-041970 A | 2/2005 |
| JP | 2007-091909 A | 4/2007 |
| JP | 2008-031194 A | 2/2008 |
| JP | 2009-052031 A | 3/2009 |
| JP | 2010-222418 A | 10/2010 |
| JP | 2011026609 A | 2/2011 |
| JP | 2011-063769 A | 3/2011 |
| JP | 2011-144271 A | 7/2011 |
| JP | 2011-202037 A | 10/2011 |
| JP | 2011-213745 A | 10/2011 |
| JP | 2011-213747 A | 10/2011 |
| JP | 2011-241359 A | 12/2011 |
| WO | 2008/023812 A1 | 2/2008 |
| WO | WO 2011/149022 A1 | 12/2011 |

OTHER PUBLICATIONS

Machine translation of JP 2003-292838 (2003).*
Japanese Office Action issued Sep. 2, 2014 in Patent Application No. 2011-054366 (with English language translation).
Japanese Office Action issued Sep. 2, 2014 in Patent Application No. 2011-054367 (with English language translation).
Combined Chinese Office Action and Search Report issued Aug. 4, 2014 in Patent Application No. 201280012827.3 (with English language translation).

(Continued)

*Primary Examiner* — Doris Lee
(74) *Attorney, Agent, or Firm* — Oblon, McClelland, Maier & Neustadt, L.L.P.

(57) ABSTRACT

Provided is an inkjet pigment ink which contains a pigment that is selected from the group consisting of C.L. Pigment Yellow 74 having a transmittance of 70% or more, C.I. Pigment Red 269 having a transmittance of 70% or more, C.I. Pigment Red 122 having a transmittance of less than 70% and C.I. Pigment Yellow 150; a water-soluble solvent that is selected from the group consisting of glycol ethers and diols; water; and a pigment dispersing resin that is a copolymer which contains a monomer A, a monomer B and a monomer C as unit components. The monomer A is an alkyl (meth)acrylate ester; the monomer B is styrene, α-methyl styrene or benzyl (meth)acrylate; and the monomer C is (meth)acrylic acid.

20 Claims, No Drawings

(56) References Cited

OTHER PUBLICATIONS

English translation of the International Preliminary Report on Patentability issued Sep. 26, 2013 in PCT/JP2012/056199 filed Mar. 9, 2012.
English translation of the Written Opinion issued Jun. 12, 2012 in PCT/JP2012/056199 filed Mar. 9, 2012.
Japanese Office Action issued Sep. 2, 2014, in Japan Patent Application No. 2011-064821 (with English translation).
Combined Office Action and Search Report issued Feb. 16, 2015 in Chinese Patent Application No. 201280012827.3 (with English translation).
Search Report issued Apr. 28, 2015 in EP application No. 12757748.4-1302/2684919.
Office Action in CN Application No. 201280012827.3 issued Aug. 3, 2015 with English Translation.
Office Action issued Dec. 31, 2015 in Chinese Office Action No. 2012800128273 (with English translation).
Search Report issued in EP Patent Application No. 12757748.4-1302/2684919 on Aug. 19, 2015.
Office Action issued Apr. 28, 2016 in the counterpart European Application No. 12757748.4.
European Search Report issued on May 18. 2016, in European Patent Application No. 16157079.1, 15 pages.
Office Action dated Apr. 4, 2017, in European Application No. 12757748.4 filed Mar. 9, 2012.
Office Action dated Apr. 4, 2017, in European Application No. 16157079.1 filed Mar. 9, 2012.

* cited by examiner

INKJET PIGMENT INK

TECHNICAL FIELD

The present invention relates to an inkjet ink, an ink set, and a printed material.

BACKGROUND ART

An inkjet recording system is a recording system that directly discharges an ink droplet onto a recording member from a significantly minute nozzle, and causes the ink droplet to adhere to obtain a character or an image. According to the system, there is a merit in that a device in use is quiet, and operability is excellent, and a merit in that it is easy to colorize, and plain paper may be used as the recording member. Thus, the system is widely used as output equipment in an office and home. On the other hand, a digital printing is expected to be used as output equipment due to an enhancement of an ink-jet technology in industrial use, and an aqueous pigment ink is desired in terms of environment, tolerance of a printed material, and the like.

Referring to the aqueous pigment ink, since a pigment is insoluble in water, dispersion stabilization in water is attempted using a dispersing resin to maintain dispersion of the pigment in an ink (for example, see Patent Literatures 1, 2, and 3). In addition, in a case of the inkjet recording system, a water-soluble solvent which is regarded as a moisturizing agent and has a high boiling point is contained to prevent drying of a nozzle.

In general, in a drying mechanism of a water-color ink, an ink impacts on a base material, and then is divided into permeation into the base material and evaporation. However, contribution to permeation is extremely great, and permeation of an ink is slow in a base material having a high hydrophobicity such as coated paper, art paper, and a vinyl chloride sheet. Thus, in a case of multicolored printing, color mixture of inks occurs, and there are problems in that a clean image may not be formed, a printing speed may not be increased, and the like. For this reason, there is a need to attempt to enhance a drying characteristic by adding a water-soluble solvent having a high boiling point and a high permeability to an ink.

However, adding a permeable solvent to an ink may change a dissolved state of a dispersing resin that stabilizes a pigment dispersion state, and significantly degrade pigment dispersibility and preservation stability.

That is, there has been a desire for a combination of a solvent having a high permeability and a pigment dispersing resin that does not degrade pigment dispersibility even when the solvent is present.

In addition, C.I. Pigment Yellow 150 is used and in practical use as a yellow pigment having a high weather resistance in an inkjet solvent ink and the like, and is rare in a water-color ink due to a low dispersion stability.

Patent Literature 4 discloses a water-color ink in which C.I. Pigment Yellow 150 is dispersed using a surfactant. However, dispersion stability is predicted to decrease in a dispersion using a surfactant when mixed with a solvent having a high permeability. For this reason, a permeable solvent may not be added, and practical use may not be achieved in printing on a base material having a high hydrophobicity such as coated paper and vinyl chloride sheet. Patent Literature 5 discloses a water-color ink stabilized by dispersing C.I. Pigment Yellow 150 using a pigment dispersing resin. Dispersion stability is deemed to be maintained even when mixed with a solvent having a high permeability since a pigment dispersing resin is used. However, a great amount of solvent occupies an ink, drying is significantly slow on a base material, and color mixture occurs between inks. Thus, a good-quality printed material may not be obtained on a base material having a high hydrophobicity.

In addition, a pigment having an excellent weather resistance is limited among magenta pigments. However C.I. Pigment Red 122 is excellent among magenta pigments. However, referring to C.I. Pigment Red 122, a great number of pigments have a hydrophilic surface when compared to another color. Thus, it is difficult to manufacture an ink having an excellent dispersion stability so far. In particular, it is much more difficult to ensure dispersion stability when a solvent having a high permeability is used.

That is, there is a desire for an ink capable of maintaining dispersion stability even when a solvent having a high permeability is present in C.I. Pigment Red 122 having an excellent weather resistance.

CITATION LIST

Patent Literatures

Patent Literature 1: JP 64-6074 A
Patent Literature 2: JP 64-31881 A
Patent Literature 3: JP 3-210373 A
Patent Literature 4: JP 2003-55590 A
Patent Literature 5: JP 2007-91909 A

SUMMARY OF THE INVENTION

An embodiment of the invention relates to an inkjet pigment ink including: a pigment that is selected from the group consisting of C.I. Pigment Yellow 74 having a transmittance of 70% or more, C.I. Pigment Red 269 having a transmittance of 70% or more, C.I. Pigment Red 122 having a transmittance of less than 70%, and C.I. Pigment Yellow 150; a water-soluble solvent that is selected from the group consisting of glycol ethers and diols; water; and a pigment dispersing resin that is a copolymer which contains a monomer A, a monomer B, and a monomer C as unit components, wherein the transmittance is a transmittance of an aqueous layer measured by a turbidimeter (NDH2000, manufactured by NIPPON DENSHOKU INDUSTRIES CO., LTD) when a 1.00% by weight pigment is added to water, is shaken, and is left for an hour, and then the aqueous layer is collected, and is put in a 50 mm angular cell, and the monomer A is an alkyl (meth)acrylate ester, the monomer B is styrene, α-methyl styrene, or benzyl (meth)acrylate, and the monomer C is (meth)acrylic acid.

The pigment may be selected from C.I. Pigment Yellow 74 having a transmittance of 70% or more and C.I. Pigment Red 269 having a transmittance of 70% or more, and the monomer A may be (meth)acrylate ester having a C10-C24 alkyl group.

The pigment may be C.I. Pigment Red 122 having a transmittance of less than 70%, and the monomer A may be (meth)acrylate ester having a C12-C24 alkyl group.

The pigment may be C.I. Pigment Yellow 150, and the monomer A may be (meth)acrylate ester having a C18-C24 alkyl group.

An acid value of the pigment dispersing resin may be 50 mgKOH/g or more and 400 mgKOH/g or less. The monomer A may be selected from the group consisting of lauryl (meth)acrylate, stearyl (meth)acrylate, and behenyl (meth)acrylate. Further, the monomer B may be styrene. The pigment may be C.I. Pigment Yellow 74 treated with a modified rosin having an acid value of 50 or less. The pigment may be C.I. Pigment Red 122 undergoing a hydrophilic treatment. An adsorption rate of a dispersant with respect to a pigment may be 10% or more when being put at a ratio pigment/dispersing resin (non-volatile matter)=7/3 in a dispersing element including the pigment, the dispersant, and a solvent. An adsorption rate of a dispersant with respect to a pigment may be 10% or more when being put at a ratio pigment/dispersing resin (non-volatile matter)=4/1 in a dispersing element including the pigment, the dispersant, and a solvent. The glycol ethers may be selected from (poly)alkylene glycol monoalkyl ether and (poly)alkylene glycol dialkyl ether. The diols may be a C3-C6 alkanediol. A resin fine particle may be further included.

In addition, an embodiment of the invention relates to an ink set of yellow, magenta, cyan, and black including the inkjet pigment ink described above.

Further, the invention relates to Embodiments I to III below.

Embodiment I

An object of Embodiment I is to provide an inkjet pigment ink which is excellent at a printing characteristic on a general printing base material, in particular, a base material having a high hydrophobicity such as coated paper, art paper, and vinyl chloride sheet, and is excellent at preservation stability and ejection stability from an inkjet nozzle.

That is, Embodiment I relates to an inkjet pigment ink including a pigment, a water-soluble solvent, water, and a pigment dispersing resin, wherein the pigment is a pigment characterized in that a transmittance of an aqueous layer is 70% or more in a result of a measurement using a turbidimeter (NDH2000, manufactured by NIPPON DENSHOKU INDUSTRIES CO., LTD) when a 1.00% by weight pigment is added to water, is shaken, and is left for an hour, and then the aqueous layer is collected, and is put in a 50 mm angular cell of the turbidimeter (NDH2000, manufactured by NIPPON DENSHOKU INDUSTRIES CO., LTD), the pigment dispersing resin is a copolymer which contains a monomer A, a monomer B, and a monomer C described below as copolymer compositions, monomer A: (meth)acrylate ester having a C10-C24 alkyl group monomer B: styrene, α-methyl styrene, or benzyl (meth)acrylate monomer C: (meth)acrylic acid, and the water-soluble solvent is at least one selected from glycol ethers and diols.

In Embodiment I, the acid value of the pigment dispersing resin may be 50 mgKOH/g or more and 400 mgKOH/g or less. In addition, the monomer A may be at least one selected from lauryl (meth)acrylate, stearyl (meth)acrylate, and behenyl (meth)acrylate. In addition, the monomer B may be styrene. In addition, the pigment may be yellow and magenta. In addition, the pigment may be C.I. Pigment Yellow 74 or C.I. Pigment Red 269. In addition, the pigment may be C.I. Pigment Yellow 74 treated with a modified rosin having an acid value of 50 or less. In addition an adsorption rate of a dispersant with respect to a pigment may be 10% or more when being put at a ratio pigment/dispersing resin (non-volatile matter)=7/3 in a dispersing element including the pigment, the dispersant, and a solvent. In addition, the glycol ethers may be (poly)alkylene glycol monoalkyl ether. In addition, the diols may be a C3-C6 alkanediol. In addition, a resin fine particle may be included. Further, the embodiment relates to an ink set of yellow, magenta, cyan, and black including the inkjet pigment ink described above, and a printed material which is printed with the inkjet pigment ink.

According to Embodiment I, there is provided an aqueous inkjet pigment ink which is excellent at a printing characteristic on a general printing base material, in particular, a base material having a high hydrophobicity such as coated paper, art paper, and vinyl chloride sheet, and is excellent at preservation stability and ejection stability from an inkjet nozzle.

Embodiment II

An object of Embodiment II is to provide an inkjet pigment ink which is excellent at a printing characteristic on a general printing base material, in particular, a base material having a high hydrophobicity such as coated paper, art paper, and vinyl chloride sheet, and is excellent at preservation stability and ejection stability from an inkjet nozzle.

That is, the second embodiment relates to an inkjet pigment ink including C.I. Pigment Red 122, a water-soluble solvent, water, and a pigment dispersing resin, wherein the pigment is a pigment characterized in that a transmittance of an aqueous layer is less than 70% in a result of a measurement using a turbidimeter (NDH2000, manufactured by NIPPON DENSHOKU INDUSTRIES CO., LTD) when a 1.00% by weight pigment is added to water, is shaken, and is left for an hour, and then the aqueous layer is collected, and is put in a 50 mm angular cell of the turbidimeter (NDH2000, manufactured by NIPPON DENSHOKU INDUSTRIES CO., LTD), the pigment dispersing resin is a copolymer which contains a monomer A, a monomer B, and a monomer C described below as copolymer compositions, monomer A: (meth)acrylate ester having a C12-C24 alkyl group monomer B: styrene, α-methyl styrene, or benzyl (meth)acrylate monomer C: (meth)acrylic acid, and the water-soluble solvent is at least one selected from glycol ethers and diols.

In Embodiment II, the acid value of the pigment dispersing resin may be 50 mgKOH/g or more and 400 mgKOH/g or less. In addition, the monomer A may be at least one selected from lauryl (meth)acrylate, stearyl (meth)acrylate, and behenyl (meth)acrylate. In addition, the monomer B may be styrene. In addition, C.I. Pigment Red 122 may be a pigment undergoing a hydrophilic treatment. In addition, an adsorption rate of a dispersant with respect to a pigment may be 10% or more when being put at a ratio pigment/dispersing resin (non-volatile matter)=4/1 in a dispersing element including the pigment, the dispersant, and a solvent. In addition, the glycol ethers may be (poly)alkylene glycol monoalkyl ether. In addition, the diols may be a C3-C6 alkanediol. In addition, a resin fine particle may be further included. Further, the embodiment of the invention relates to an ink set of yellow, magenta, cyan, and black including the inkjet pigment ink described above, and a printed material which is printed with the ink set.

According to Embodiment II, there is provided an aqueous inkjet magenta ink which is excellent at a printing characteristic on a general printing base material, in particular, a base material having a high hydrophobicity such as coated paper, art paper, and vinyl chloride sheet, and is excellent at preservation stability and ejection stability from an inkjet nozzle.

Embodiment III

An object of Embodiment III is to provide an aqueous inkjet yellow ink which is excellent at a printing characteristic on a general printing base material, in particular, a base material having a high hydrophobicity such as coated paper, art paper, and vinyl chloride sheet, and is excellent at weather resistance, preservation stability, and ejection stability from an inkjet nozzle in an inkjet recording pigment ink.

That is, Embodiment III relates to an inkjet yellow ink containing at least C.I. Pigment Yellow 150, a water-soluble solvent, water, and a pigment dispersing resin, characterized in that the pigment dispersing resin is a copolymer which contains a monomer A, a monomer B, and a monomer C described below as copolymer compositions, and the water-soluble solvent is at least one selected from glycol ethers and diols.

monomer A: (meth)acrylate ester having a C18-C24 alkyl group monomer B: styrene, α-methyl styrene, or benzyl (meth)acrylate monomer C: (meth)acrylic acid In Embodiment III, an acid value of the pigment dispersing resin may be 50 to 400 mgKOH/g. In addition, the monomer A may be behenyl (meth)acrylate. In addition, a resin fine particle may be included. In addition, the glycol ethers may be (poly)alkylene glycol mono(or di)alkyl ether. In addition, in the invention, the diols may be a C3-C6 alkanediol. Further, the embodiment relates to an ink set of four or more colors including the inkjet yellow ink described above, and at least cyan, magenta, and black, and a printed material which is printed with the inkjet ink.

According to Embodiment III, it is possible to provide an aqueous inkjet yellow ink which is excellent at a printing characteristic on a general printing base material, in particular, a base material having a high hydrophobicity such as coated paper, art paper, and vinyl chloride sheet, and is excellent at weather resistance, preservation stability, and ejection stability from an inkjet nozzle.

The disclosure of the specification relates to a subject matter described in Japanese Patent Application No. 2011-054367, filed on Mar. 11, 2011, Japanese Patent Application No. 2011-054366, filed on Mar. 11, 2011, and Japanese Patent Application No. 2011-064821, filed on Mar. 23, 2011, and the entire disclosure of which is incorporated in this specification by reference.

MODE(S) FOR CARRYING OUT THE INVENTION

Hereinafter, an inkjet pigment ink (hereinafter, referred to as an ink or a pigment ink) is described with preferred embodiments.

The pigment ink of the embodiment contains a pigment, a water-soluble solvent, water, and a pigment dispersing resin.

<Pigment Dispersing Resin>

A pigment dispersing resin includes a copolymer which contains; alkyl (meth)acrylate ester (monomer A); styrene, α-methyl styrene, or benzyl (meth)acrylate (monomer B); and (meth)acrylic acid (monomer C) as copolymer compositions. First, the monomers A, B, and C are described. Further, a copolymer obtained by copolymerization of the monomers A, B, and C is described.

Examples of alkyl (meth)acrylate ester (monomer A) include decyl (meth)acrylate, undecyl (meth)acrylate, lauryl (meth)acrylate, tridecyl (meth)acrylate, tetradecyl (meth)acrylate, pentadecyl (meth)acrylate, hexadecyl (meth)acrylate, heptadecyl (meth)acrylate, stearyl (meth)acrylate, isostearyl (meth)acrylate, behenyl (meth)acrylate, and the like.

Among the examples, it is preferable that the monomer A use lauryl (meth)acrylate, stearyl (meth)acrylate, and behenyl (meth)acrylate to attempt an advanced enhancement of preservation stability.

In particular, C10-C24 alkyl (meth)acrylate ester is preferable in Embodiment I, (meth)acrylate ester having a C12-C24 alkyl group is preferable as the monomer A in Embodiment II, and (meth)acrylate ester having a C18-C24 alkyl group is preferable in Embodiment III in terms of preservation stability.

The monomer B is styrene, α-methyl styrene, or benzyl (meth)acrylate. Among the examples, it is preferable that styrene be used to attempt an advanced enhancement of preservation stability.

The copolymer may be obtained by copolymerizing the monomers A, B, and C described above, and may be formed by copolymerizing a monomer having aromatic series other than styrene, α-methyl styrene, or benzyl (meth)acrylate in addition to the monomers.

In addition, the monomer C is (meth)acrylic acid. The copolymer may be obtained by copolymerizing the monomers A, B, and C described above, and may be formed by copolymerizing a monomer having an acid functionality other than (meth)acrylic acid in addition to the monomers. A vinyl compound having an acid functionality described below is given as the monomer having an acid functionality that may be used in this case. For example, methacrylic acid, maleic acid, maleate half ester, itaconic acid, itaconic acid half ester, fumaric acid, fumaric acid half ester, vinylsulfonic acid, vinyl phosphonic acid, and the like may be further copolymerized.

Further, it is preferable that a ratio of the monomer A to the monomer B be monomer A/monomer B=1/9 to 9/1, more preferably, monomer A/monomer B=1/4 to 4/1. When the ratio of the monomer A to the monomer B is greater than 1/9, hydrophobicity of the copolymer is excellent, adhesion of the copolymer with respect to a surface of a pigment is excellent, and preservation stability of a pigment ink is excellent. When the ratio of the monomer A to the monomer B is less than 9/1, affinity with a surface of a pigment of the copolymer is great, adhesion of the copolymer with respect to a surface of a pigment is excellent, and preservation stability of a pigment ink is excellent.

Further, it is preferable that a ratio of a total amount of the monomers A, B, and C to a whole quantity of the copolymer be 70 to 100% by weight. In addition, it is preferable that a ratio of a total amount of the monomers A and B to a whole quantity of the copolymer be 50 to 70% by mass.

It is preferable that a weight-average molecular weight of the copolymer be in a rage of 2,000 to 30,000, more preferably, in a range of 5,000 to 20,000. In addition, the copolymer is formed by copolymerizing acrylic acid as the monomer C, and it is preferable that a component ratio of a monomer having an anionic functional group in the monomer is as below when indicated by an acid value. That is, it is preferable that an acid value of the copolymer to be used be in a range of 50 mgKOH/g or more and 400 mgKOH/g or less, more preferably in a range of 80 mgKOH/g or more and 300 mgKOH/g or less. When the acid value is 50 mgKOH/g or more, dispersion stability of a pigment ink is great, and ejection stability is excellent. In addition, when the acid value is 400 mgKOH/g or less, adhesion of the copolymer with respect to a surface of a pigment is excellent, and preservation stability of a pigment ink is excellent. A weight-average molecular weight or an acid value of a copolymer or a polymer in the invention may be measured in a usual manner.

Referring to an ink, dispersion stabilization of a pigment particle may be attempted by ionizing acrylic acid for forming a copolymer to be contained, and the monomer having an acid functionality which is separately introduced. For this reason, it is preferable that a whole ink be adjusted to neutral or alkalinity. However, excessively strong alkalinity may be a cause for corrosion of various members used for an inkjet recording device and thus, a range of 7 to 10 pH is preferable. A pH adjuster used in this instance is given below. For example, it is possible to use aqueous ammonia, various organic amines such as dimethylaminoethanol, diethanolamine, and triethanolamine, an inorganic alkaline agent such as a hydroxide of an alkali metal such as sodium hydroxide, lithium hydroxide, and potassium hydroxide, an organic acid, a mineral acid, and the like. The copolymer described above is dispersed or dissolved in an aqueous liquid medium.

Subsequently, a method of manufacturing the copolymer is described. The copolymer is obtained by a normal solution polymerization of acryl. However, in this instance, the copolymer is dissolved in a solvent, and schemes for dispersing or dissolving the copolymer in an aqueous liquid medium are described below. As a first scheme, polymerization is performed in a solvent which is azeotropic with water, and then water and amine are added to perform neutralization and form an aqueous solution. Further, the solution is boiled, then it purely contains only water. As a second scheme, polymerization is performed in a water-soluble solvent finally contained in an ink as a synthetic solvent. Thereafter, water and amine are added to perform neutralization and form an aqueous solution. However, the solvent is not removed, and a premixing and a dispersion treatment described below are preformed without change.

The synthetic solvent of the first scheme may form an azeotropic mixture with water, and preferably have a high solubility with respect to the copolymer. It is preferable to use ethanol, 1-propanol, 2-propanol, and 1-butanol, more preferably 1-butanol.

The synthetic solvent of the second scheme may be an aqueous solvent which is finally contained in an ink, and preferably have a high solubility with respect to the copolymer. It is preferable to use glycol ethers and diols, more preferably (poly)alkylene glycol monoalkyl ether and C3-C6 alkanediols.

Subsequently, a reason for an excellent printing characteristic, and an excellent preservation stability and ejection stability from an inkjet nozzle of an ink of the embodiment is described.

First, a prime reason for the excellent printing characteristic is permeability. An ink may not be discharged when a nozzle is dried in an inkjet ink and thus, a moisturizing agent, that is, a water-soluble solvent having a high boiling point is essential. However, when the water-soluble solvent having a high boiling point is contained, drying is naturally slow. When printing is performed on a base material dedicated for an inkjet, sufficiently excellent printing characteristic may be obtained. However, when printing is performed on fine paper, coated paper (paper in which one side is coated at an amount of about 20 g/m$^2$), art paper (paper in which one side is coated at an amount of about 40 g/m$^2$), and vinyl chloride sheet which are general printing base materials, drying is slow, which may cause an uneven print density occurring due to printed dots connected to each other. In particular, the tendency is particularly significant in a case of coated paper, art paper, and vinyl chloride sheet lacking in absorption of water or solvent. Therefore, it is important to enhance drying characteristic by using a solvent having a high permeability with respect to a base material. Glycol ethers and diols that may be used as a synthetic solvent of a resin also has the characteristic, and (poly) alkylene glycol monoalkyl ether and C3-C6 alkanediols are significantly effective among glycol ethers and diols. These have a much higher permeability with respect to a base material when compared to glycerin and diethylene glycol which are solvents frequently used for an inkjet ink. That is, when the solvents are used, drying characteristic is enhanced, a problem of an uneven print density and the like is resolved, and printing characteristic is excellent.

However, the solvents involve a huge problem of degrading dispersibility of a pigment. The reason is unclear. However, it is considered that the solvents have a high hydrophobicity when compared to glycerin and diethylene glycol, and a hydrophobicity of a solvent in an ink is high and thus, a dispersing resin adsorbed onto a pigment is likely to be desorbed to a solvent, and dispersibility is degraded.

In particular, referring to preservation stability of an ink, when the solvents are used, it tends to be greatly thickened or separated.

Therefore, when hydrophobicity of a dispersing resin is enhanced, dispersibility may be inhibited from degrading. That is, it is considered that hydrophobicity of a solvent in an ink is enhanced even though the solvent is an aqueous solvent when the solvent having a high permeability is used, and it is considered that a dispersing resin is easily desorbed from a pigment to a solvent, and dispersibility is degraded when the dispersing resin is easily dissolved. In this instance, when hydrophobicity of the dispersing resin is enhanced, solubility with respect to the solvent is degraded, and the dispersing resin is rarely desorbed from a pigment to a solvent.

When alkyl (meth)acrylate ester (monomer A) is copolymerized, hydrophobicity of the dispersing resin may be enhanced, and dispersibility may be inhibited from degrading. On the other hand, when affinity of the dispersing resin with a pigment is ensured, it is possible to maintain adsorption of the dispersing resin onto a pigment. That is, a high hydrophobicity of the dispersing resin may inhibit desorption to a solvent. However the high hydrophobicity alone is insufficient. It is considered that adsorption onto a pigment may be maintained by ensuring affinity with a pigment. When styrene, α-methyl styrene, or benzyl (meth)acrylate (monomer B) are copolymerized, affinity with a pigment by an aromatic ring may be ensured, and dispersibility may be further enhanced.

Similarly to a normal dispersing resin, (meth)acrylic acid is used for the dispersing resin for a charge repulsion when ionized. It is considered that the dispersing resin adsorbed to a pigment includes (meth)acrylic acid in an ionized state, a charge repulsion between pigments occurs in an aqueous solvent, and dispersibility is maintained.

In this way, it is possible to obtain an ink excellent at printing characteristic and discharging characteristic from a nozzle when a solvent having a high permeability is used, and excellent at preservation stability when a dispersing resin in which dispersibility is not degraded even when the solvents are used is used.

It is preferable that the copolymer described above be contained in an ink in a range of 0.1% by weight or more and 8% by weight or less with respect to a total weight of the ink.

In addition, it is preferable that a ratio of the pigment to the copolymer be pigment/copolymer=20/1 to 1/1, more preferably in a range of 10/1 to 2/1.

A natural resin such as rosin, shellac, and starch, or a synthetic resin other than the copolymer described above may be preferably used for the ink as necessary. It is preferable that the natural resin or the synthetic resin in this case be contained at an amount not exceeding an additive amount of the copolymer described above.

<Pigment>

It is preferable that the pigment be contained in a range of 0.1% by weight or more and 20% by weight or less, more preferably 0.1% by weight or more and 12% by weight or less in a total weight of an ink.

In Embodiment I, a pigment defined in an affinity test of a pigment with respect to water described below may be used as the pigment.

Affinity Test of Pigment with Respect to Water 1.00% by weight of a pigment is added to water, is sufficiently shaken (about 50 times), and is left for an hour. Thereafter, an aqueous layer is collected, and is put in a 50 mm angular cell of a turbidimeter (NDH2000, manufactured by NIPPON DENSHOKU INDUSTRIES CO., LTD). A known pigment may be used when a transmittance of an aqueous layer is 70% or more in a result of measurement using the turbidimeter (NDH2000, manufactured by NIPPON DENSHOKU INDUSTRIES CO., LTD). A transmittance of an aqueous layer may not be 70% or more in the same pigment depending on a scheme of treating a surface of the pigment. However, a pigment given below may be used as a pigment in which a transmittance of an aqueous layer is 70% or more.

In the affinity test of a pigment with respect to water, examples of a yellow pigment among pigments in which a transmittance of an aqueous layer is 70% or more include C.I. Pigment Yellow 74, 180, and the like.

In terms of color development, C.I. Pigment Yellow 74 is particularly preferable.

In addition, referring to FAST Yellow 7416 (manufactured by Sanyo Color Works, LTD.) treated with a modified rosin having an acid value of 50 or less, it is preferable that hydrophobicity of a surface of a pigment be increased when compared to C.I. Pigment Yellow 74, and an amount of absorption of a dispersing resin be increased when compared to C.I. Pigment Yellow 74 not treated with a modified rosin.

In addition, examples of a magenta pigment include C.I. Pigment Red 269, C.I. Pigment Violet 19, 23, and the like.

In terms of color development, C.I. Pigment Red 269 and the like are particularly preferable. Permanent Carmine 3810 (manufactured by Sanyo Color Works, LTD.) is particularly preferable in terms of color development.

Treatment may be performed with a modified rosin to obtain a hydrophobized pigment. When a pigment is treated with a modified rosin having a relatively low acid value, adsorptivity between a dispersant and the pigment is relatively great, which is preferable. It is preferable that an acid value of the modified rosin be 50 mgKOH/g or less.

It is preferable that an amount of the modified rosin to be treated be 3 to 25% by weight with respect to a pigment. When the amount is 3% or more, effect of a surface treatment is obtained, and temporal stability of a dispersing element is excellent. When the amount is 25% or less, a modified rosin failing to be adsorbed is absent, and temporal stability is excellent. In particular, it is preferable that an amount of the modified rosin to be treated be 5 to 20% by weight.

In Embodiment II, C.I. Pigment Red 122 is used as a pigment. Pigment Red 122 is a pigment characterized in that a transmittance of an aqueous layer is less than 70% in a result of a measurement using a turbidimeter (NDH2000, manufactured by NIPPON DENSHOKU INDUSTRIES CO., LTD) when 1.00% by weight of a pigment is added to water, is sufficiently shaken (about 50 times), and is left for an hour, and then the aqueous layer is collected, and is put in a 50 mm angular cell of the turbidimeter (NDH2000, manufactured by NIPPON DENSHOKU INDUSTRIES CO., LTD), that is, is Pigment Red 122 including a hydrophilic surface.

Referring to a dispersion of C.I. Pigment Red 122, desorption of the dispersing resin to a solvent particularly easily occurs and thus, it is significantly important to introduce a long chain alkyl group having a high hydrophobicity into the dispersing resin. $C_{12}$ to $C_{24}$, in particular, $C_{18}$ to $C_{24}$ are effective among long chain alkyl groups. However, a dispersant into which the long chain alkyl group is introduced is effective for C.I. Pigment Red 122 including a hydrophilic surface, and is ineffective for C.I. Pigment Red 122 having a hydrophobic surface. The reason is unclear, and may be an excessively strong hydrophobic interaction.

As a result of the measurement, the pigment in which transmittance of an aqueous layer is less than 70% is, for example, a pigment including a hydrophilic surface treated with a modified rosin having a high acid value or a derivative having a hydrophilic group during a manufacture of the pigment.

In Embodiment III, C.I. Pigment Yellow 150 is used as a yellow ink. A high weather resistance is achieved when C.I. Pigment Yellow 150 is used. An azo pigment is frequently used as a yellow pigment which is used for a general printing, and is easily decomposed by an ultraviolet ray and the like, and color degradation of a printed material occurs. However, C.I. Pigment Yellow 150 is a metal complex pigment, and maintains an extremely high weather resistance since the pigment is rarely decomposed.

A pigment other than the pigment described as a pigment that may be used in each Embodiment may be used as an ink set with the pigment.

A known pigment is used as the pigment.

Examples of a black pigment that may be used include carbon black manufactured by a furnace method and a channel method. For example, it is preferable to use carbon black having characteristics in which a primary particle diameter is 11 to 40 m$\mu$m (nm), a specific surface area by a BET method is 50 to 400 m$^2$/g, volatile matter content is 0.5 to 10% by weight, pH value is 2 to 10, and the like. An article on the market having the characteristics is given below. For example, No. 33, 40, 45, 52, 900, 2200B, 2300, MA7, MA8, MCF88 (which are manufactured by Mitsubishi Chemical Corporation), RAVEN1255 (manufactured by Columbian carbon), REGAL330R, 400R, 660R, MOGUL L, ELFTEX415 (which are manufactured by Cabot Corp.), Nipex90, Nipex150T, Nipex 160IQ, Nipex 170IQ, Nipex 75, Printex 85, Printex 95, Printex 90, Printex 35, Printex U (which are manufactured by Evonik Degussa), and the like are given, and each of which may be preferably used.

In addition, examples of a cyan pigment include C.I. Pigment Blue 1, 2, 3, 15:3, 15:4, 16, 22, C.I. Vat Blue 4, 6, and the like. In addition, examples of a yellow pigment include C.I. Pigment Yellow 1, 2, 3, 12, 13, 14, 16, 17, 20, 24, 74, 83, 86, 93, 94, 95, 109, 110, 117, 120, 125, 128, 137, 138, 139, 147, 148, 150, 151, 154, 155, 166, 168, 180, 185, 213, and the like.

In addition, examples of a magenta pigment include C.I. Pigment Red 5, 7, 9, 12, 31, 48, 49, 52, 53, 57, 97, 112, 122, 147, 149, 150, 168, 177, 178, 179, 202, 206, 207, 209, 238, 242, 254, 255, 269, C.I. Pigment Violet 19, 23, 29, 30, 37, 40, 50, and the like.

A pigment having a color other than the colors described above may be used, and each of the pigments including the pigment may be used alone or as a mixture of two or more pigments in each color ink. It is needless to mention that the invention is not limited thereto. In addition, a newly manufactured pigment such as a self-dispersing pigment may be used in addition to the pigments.

<Water-Soluble Solvent>

A mixed solvent of water and a water-soluble solvent is suitable for an aqueous medium when an ink of the embodiment is formed, and it is preferable to use ion-exchanged water (deionized water) rather than general water containing various ions as the water.

Glycol ethers and diols are excellent as the water-soluble solvent that is mixed with water and is used, and (poly) alkylene glycol monoalkyl ether and a C3-C6 alkanediol are effective among glycol ethers and diols. As described in the foregoing, the solvents permeate into a base material at a significantly high speed. A speed of the permeation is high even for a base material in which a solvent has a low absorbability such as coated paper, art paper, and a vinyl chloride sheet. For this reason, a speed of drying is high during printing, and an accurate printing may be achieved. In addition, since a boiling point is high, a function as a moisturizing agent is sufficient.

Specific examples of glycol ethers include ethylene glycol monoethyl ether, ethylene glycol monobutyl ether, diethylene glycol monomethyl ether, diethylene glycol monoethyl ether, diethylene glycol monopropyl ether, diethylene glycol monobutyl ether, diethylene glycol monopentyl ether, diethylene glycol monohexyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monobutyl ether, propylene glycol monopropyl ether, propylene glycol monobutyl ether, dipropylene glycol monomethyl ether, tripropylene glycol monomethyl ether, and the like.

Examples of glycol dialkyl ether include diethylene glycol dimethyl ether, triethylene glycol dimethyl ether, tetraethylene glycol dimethyl ether, diethylene glycol diethyl ether, triethylene glycol diethyl ether, tetraethylene glycol diethyl ether, diethylene glycol methyl ethyl ether, triethylene glycol methylethyl ether, tetraethylene glycol methyl ethyl ether, diethylene glycol butyl methyl ether, triethylene glycol butyl methyl ether, tetraethylene glycol butyl methyl ether, and the like.

It is preferable to use a glycol ether in which a total carbon number of an alkyl group at both ends is 2 to 8 among (poly)alkylene glycol mono(or di)alkyl ethers, more preferable a glycol ether in which a total carbon number is 4 to 6. It is possible to exhibit a high efficiency due to wetting and permeation in the range. In addition, it is sufficiently effective for wetting and permeation when either glycol monoalkyl ether or glycol dialkyl ether is used. However, glycol dialkyl ether may be more suitably used when printing is performed on a poorly absorbable (unabsorbent) base material such as a polyvinyl chloride sheet in which a small amount of ink is absorbed. Glycol dialkyl ether has a significantly high permeability, and permeates into a poorly absorbable (unabsorbent) base material and thus, blotting rarely occurs. As a result, an excellent printed material may be obtained. In particular, it is preferable to use diethylene glycol diethyl ether, tetraethylene glycol dimethyl ether, diethylene glycol butyl methyl ether, triethylene glycol butyl methyl ether among glycol dialkyl ether solvents.

Specific examples of diols include 1,2-propanediol, 1,3-propanediol, 1,2-butanediol, 1,3-butanediol, 1,2-pentanediol, 1,5-pentanediol, 1,2-hexanediol, 1,6-hexanediol, 2-methyl-2, 4-pentanediol, and the like. It is preferable to use 1,2-alkylenediol such as 1,2-propanediol, 1,2-butanediol, 1,2-pentanediol, and 1,2-hexanediol among the diols.

Diethylene glycol monobutyl ether, diethylene glycol monohexyl ether, triethylene glycol monomethyl ether, 1,2-propanediol, 1,2-butanediol, 1,3-butanediol, 1,2-hexanediol, 2-methyl-2, and 4-pentanediol are effective among the diols.

The solvents may be used alone or be used as a mixture of a plurality of solvents. In particular, when both (poly) alkylene glycol mono(or di)alkyl ether and diols are used, a high preservation stability may be maintained while exhibiting excellent wetting and permeation. Further, depending on a type of a base material to be printed, it is possible to add a water-soluble nitrogen-containing heterocyclic compound such as 2-pyrrolidone, N-methylpyrrolidone, N-ethylpyrrolidone, N-methyloxazolidinone, and N-ethyloxazolidinone to enhance a solubility.

It is preferable that a contained amount of the water-soluble organic solvent in an ink be in a range of 10 to 60% by mass of a total mass of the ink, more preferably 10 to 50% by mass in terms of discharging characteristic and drying characteristic. When the amount is 10% by mass or more, discharging characteristic is excellent without the ink drying, wettability of the ink into a base material is sufficient, and an image formation is excellent. When the amount is 60% by weight or less, a viscosity is in an appropriate range, discharging characteristic is excellent, a speed of drying is high, and spreading of a printed image is absent.

In addition, it is preferable that a contained amount of water be in a range of 10% by weight or more and 90% by weight or less of a total mass of the ink, more preferably 10 to 80% by weight, still more preferably 30% by weight or more and 80% by weight or less, and particularly preferably 30 to 70% by weight.

<Aqueous Resin Fine Particle>

Further, an ink of the embodiment may contain an aqueous resin fine particle. When an aqueous resin fine particle is contained, it is possible to enhance a tolerance of a printed coating film without excessively increasing a viscosity. In this way, a water resistance, a solvent resistance, an abrasion resistance, and the like are enhanced. When a water-soluble resin is added, a tolerance is expected to be enhanced to some extent. However, a viscosity tends to increase. In a case of an inkjet ink, a viscosity at which an ink may be discharged from a nozzle is in a range. When a viscosity is excessively high, an ink may not be discharged. Thus, it is important to suppress an increase in viscosity.

When an aqueous resin fine particle is used as a fixing resin, a tolerance of a printed material can be enhanced. A water-soluble resin and a resin fine particle are known as a fixing resin of a water-color ink when the fixing resin is roughly classified. In general, a resin fine particle has a large molecular weight when compared to a water-soluble resin, and a high tolerance may be achieved. In addition, when a resin fine particle is used, an ink viscosity may be decreased, and a greater amount of resin may be mixed with an ink. Thus, a resin fine particle is suitable for enhancing a tolerance of an inkjet ink. Examples of a type of resin fine particle include acrylic particles, urethane series, styrene-butadiene particles, vinyl chloride particles, polyolefin series, and the like.

Further, it is preferable that an ink of the embodiment contain a resin fine particle. When a resin fine particle is contained, it is possible to enhance a tolerance of a printed coating film without excessively increasing a viscosity. In this way, a water resistance, a solvent resistance, an abrasion resistance, and the like are enhanced. When a water-soluble resin is added, a tolerance is expected to be enhanced to some extent. However, a viscosity tends to increase. In a case of an inkjet ink, a viscosity at which an ink may be discharged from a nozzle is in a range. When a viscosity is excessively high, an ink may not be discharged. Thus, it is important to suppress an increase in viscosity.

A contained amount of the resin fine particle as solid content in an ink is in a range of 2% by weight or more and 30% by weight or less of a total weight of the ink, more preferably in a range of 3% by weight or more and 20% by weight or less.

<Other Components>

Furthermore, in addition to the components described above, an additive such as a surfactant, an antifoamer, and an antiseptic may be appropriately added so that an ink of the embodiment has a desired material property as necessary. For example, it is preferable that an additive amount of the additives be 0.05% by weight or more and 10% by weight or less, more preferably 0.2% by weight or more and 5% by weight or less with respect to a total weight of an ink.

<Method of Manufacturing Ink>

Examples of a method of manufacturing an ink including the components include a method described below. However, the invention is not limited thereto. First, a pigment is added to an aqueous medium mixed with at least a copolymer and water, mixing and agitation are performed, and then a dispersion treatment is performed using a dispersion unit described below, and a centrifugal separation treatment is carried out as necessary, thereby obtaining desired pigment dispersion liquid. Subsequently, a water-soluble solvent or an additive component appropriately selected as described above is added to the pigment dispersion liquid as necessary, and agitation and filtration, as necessary, are performed to obtain an ink. It is preferable that a base be added while the pigment dispersion liquid is manufactured so that the copolymer used in the invention is favorably dissolved in an ink. In this way, dispersion stability of an ink may be enhanced. Bases used in this case are given below. For example, it is possible to preferably use an organic amine such as monoethanolamine, diethanolamine, triethanolamine, amine methyl propanol, ammonia, or an inorganic base such as potassium hydroxide, sodium hydroxide, lithium hydroxide.

As described in the foregoing, pigment dispersion liquid obtained by performing a dispersion treatment in a manufacture of an ink is used in a method of manufacturing a pigment ink, and it is effective when a premixing is performed before a dispersion treatment which is performed when pigment dispersion liquid is manufactured. That is, the premixing may be performed by adding a pigment to an aqueous medium mixed with at least a copolymer and water. The premixing operation is preferable since wettability of a surface of a pigment can be improved, and an adsorption of a dispersant onto a surface of a pigment can be facilitated.

A generally used disperser may be used as a disperser which is used during the dispersion treatment of a pigment described above. For example, a ball mill, a roll mill, a sand mill, a bead mill, a nanomizer, and the like may be used. It is preferable to use the bead mill among the dispersers. For example, Super mill, Sand grinder, Agitator mill, Glen mill, DYNO-MILL, Pearl mill, CoBall Mill (all of which are trade names), and the like may be used. Further, in the premixing and the dispersion treatment of a pigment described above, a copolymer may be dissolved or dispersed only in water, and may be dissolved or dispersed in a mixed solvent of a water-soluble solvent and water. In particular, in the dispersion treatment, when a copolymer is dissolved or dispersed in a mixed solvent of a water-soluble solvent and water used as a synthetic solvent of a copolymer as described above, a stable dispersing element may be obtained in a dispersion treatment process.

An ink of the embodiment is an inkjet recording ink and thus, it is preferable to use a pigment having an optimal grain size distribution. That is, it is preferable to use a pigment having an optimal grain size distribution to suitably use an ink containing a pigment particle for an inkjet recording method since a clogging resistance of a nozzle and the like are requested. Examples of a scheme of obtaining a pigment having a desired grain size distribution include a scheme below. A scheme of decreasing a size of crushing media of the disperser given above, a scheme of increasing a filling rate of crushing media, a scheme of increasing processing time, a scheme of performing classification using a filter or a centrifugal separator after crushing, and a combination of the schemes are included.

<Ink Set>

A yellow or magenta ink of each embodiment may be combined with an ink having another color to form an ink set of four or more colors in which cyan, magenta, and black inks are combined. A composition of an ink other than an ink of each embodiment is not particularly limited. However, it is desirable that an ink of a color other than a color of the embodiments have a similar composition to that of an ink of the embodiments. When a similar composition is used, it is possible to cause a speed of drying during printing and wet spreading on a base material to be uniform for all colors, and enhance a printing quality.

<Printed Material>

A printed material may be formed by performing printing on a base material using an ink of each embodiment or an ink set including an ink of each embodiment. A base material is not particularly limited. However, in particular, printing characteristic is excellent on a base material having a high hydrophobicity such as coated paper, art paper, and vinyl chloride sheet.

EXAMPLES

Hereinafter, the invention is further specifically described by giving Examples and Comparative Examples for each embodiment. In description below, "part" and "%" are based on a weight unless otherwise mentioned.

Embodiment I (Manufacturing Example 1) Synthesis of Dispersing Resin 1

93.4 parts of triethylene glycol monomethyl ether was put in a reaction container including a gas introduction pipe, a thermometer, a condenser, and a stirrer, and replacement by nitrogen gas was performed. An inside of the reaction container was heated to 110° C., a mixture of 35.0 parts of lauryl methacrylate, 35.0 parts of styrene, 30.0 parts of acrylic acid, and 6.0 parts of V-601 (manufactured by Wako Pure Chemical Industries, Ltd.) was dripped for 2 hours, and a polymerization reaction was conducted. After the dripping was completed, the reaction was further conducted at 110° C. for 3 hours, and then 0.6 parts of V-601 (manufactured by Wako Pure Chemical Industries, Ltd.) was added, and the reaction was further continued at 110° C. for an hour to obtain a solution of dispersing resin 1. A weight-average molecular weight of dispersing resin 1 was about 16,000.

Further, cooling was performed up to room temperature, and then 37.1 parts of dimethylaminoethanol was added, and neutralization was conducted. The amount corresponds to an amount at which acrylic acid is 100% neutralized. Further, 200 parts of water was added to form an aqueous solution. 1 g of sample was taken, the sample was heated and dried at 180° C. for 20 minutes to measure a non-volatile matter, and water was added so that a non-volatile matter of the aqueous resin solution corresponds to 20%. In this way, an aqueous solution in which a non-volatile matter corresponds to 20% of dispersing resin 1 was obtained.

(Manufacturing Example 2) Synthesis of Dispersing Resin 2

93.4 parts of butanol was put in a reaction container including a gas introduction pipe, a thermometer, a condenser, and a stirrer, and replacement by nitrogen gas was performed. An inside of the reaction container was heated to 110° C., a mixture of 35.0 parts of lauryl methacrylate, 35.0 parts of styrene, 30.0 parts of acrylic acid, and 6.0 parts of V-601 (manufactured by Wako Pure Chemical Industries, Ltd.) was dripped for 2 hours, and a polymerization reaction was conducted. After the dripping was completed, the reaction was further conducted at 110° C. for 3 hours, and then 0.6 parts of V-601 (manufactured by Wako Pure Chemical Industries, Ltd.) was added, and the reaction was further continued at 110° C. for an hour to obtain a solution of dispersing resin 2. A weight-average molecular weight of dispersing resin 2 was about 16,000.

Further, cooling was performed up to room temperature, and then 37.1 parts of dimethylaminoethanol was added, and neutralization was conducted. The amount corresponds to an amount at which acrylic acid is 100% neutralized. Further, 200 parts of water was added to form an aqueous solution, and then the aqueous solution was heated to 90° C. or more, and azeotropic removal of butanol was conducted from the mixture of butanol and water. In response to an internal temperature reaching 100° C., a 1 g sample was taken, the sample was heated and dried at 180° C. for 20 minutes to measure a non-volatile matter, and water was added so that a non-volatile matter of the aqueous resin solution corresponds to 20%. In this way, an aqueous solution excluding an organic solvent in which a non-volatile matter corresponds to 20% of dispersing resin 2 was obtained.

Manufacturing Examples 3 to 15

Synthesis was performed similarly to Manufacturing Example 1 except that a material, an input amount, and a reaction temperature described in Table 1 were used, and solutions of dispersing resin 3 to 15 were obtained. Further, dimethylaminoethanol was added to achieve 100% neutralization, an aqueous solution was formed similarly to Manufacturing Example 1, and aqueous solutions of dispersing resin 3 to 15 were obtained.

Comparative Manufacturing Examples 1 and 2

Synthesis was performed similarly to Manufacturing Example 1 except that a material, an input amount, and a reaction temperature described in Table 1 were used, and solutions of comparative dispersing resin 1 and 2 were obtained. Further, dimethylaminoethanol was added to achieve 100% neutralization, an aqueous solution was formed similarly to Manufacturing Example 1, and aqueous solutions of comparative dispersing resin 1 and 2 were obtained.

(Manufacturing Example of Resin Fine Particle)

40 parts of ion-exchanged water and 0.2 parts of AKUARON KH-10 (manufactured by DAI-ICHI KOGYO SEIYAKU CO., LTD.) as a surfactant were put in a reaction container including an agitator, a thermometer, a dropping funnel, and a reflux apparatus, and 1% of a pre-emulsion in which 40 parts of 2-ethyl hexyl acrylate, 50 parts of methyl methacrylate, 7 parts of styrene, 2 parts of dimethylacrylamide, 1 part of methacrylic acid, 53 parts of ion-exchanged water, and 1.8 parts of AKUARON KH-10 (manufactured by DAI-ICHI KOGYO SEIYAKU CO., LTD.) as a surfactant were mixed in advance was further separately added. An internal temperature was increased to 60° C., replacement by nitrogen gas was sufficiently performed, and then 10% of 10 parts of 5% aqueous solution of potassium persulfate and 20 parts of 1% aqueous solution of anhydrous sodium bisulfite were added, and polymerization was started. An inside of a reaction system was maintained at 60° C. for 5 minutes, and then a remainder of a pre-emulsion, and a remainder of a 5% aqueous solution of potassium persulfate and a 1% aqueous solution of anhydrous sodium bisulfite were dripped for 1.5 hours while an internal temperature was maintained at 60° C., and agitation was further continued for 2 hours. After verifying that an inversion rate exceeds 98% through a measurement of solid content, a temperature was cooled down up to 30° C. Diethylaminoethanol was added to set a pH value to 8.5, and solid content was adjusted to 40% using ion-exchanged water to obtain a resin fine particle water dispersion. The solid content was searched for using a baking residue at 150° C. for 20 minutes. The obtained resin fine particle water dispersion was set to resin fine particle 1.

(Example 1) Manufacture of Dispersing Element and Manufacture of Ink 20 parts of FAST Yellow 7416 (manufactured by Sanyo Color Works, LTD.), which is Pigment Yellow 74 as a pigment, 42.9 parts of dispersing resin 1, and 37.1 parts of water were preliminarily dispersed by Dispar, and then a main dispersion was performed for 2 hours using DYNO-MILL having a volume of 0.6 L and filled with zirconia beads 1,800 g having a diameter of 0.5 mm, and a pigment dispersing element was obtained. In this instance, a ratio of a pigment to a non-volatile matter of a dispersing resin is pigment/dispersing resin (non-volatile matter)=7/3.

(Affinity Test of Pigment with Respect to Water)

1.00% by weight of a pigment is added to water, is shaken 50 times, and is left for an hour. Thereafter, an aqueous layer is collected, and is put in a 50 mm angular cell of a turbidimeter (NDH2000, manufactured by NIPPON DENSHOKU INDUSTRIES CO., LTD). A transmittance of an aqueous layer was measured in a result of a measurement using a turbidimeter (NDH2000, manufactured by NIPPON DENSHOKU INDUSTRIES CO., LTD).

(Measurement of Viscosity of Dispersing Element)

A viscosity of a pigment dispersing element was measured using an E-type viscometer ("ELD-type viscometer" manufactured by TOKI SANGYO CO., LTD) at 25° C. on condition of an engine speed 20 rpm.

(Temporal Preservation Stability of Dispersing Element)

A pigment dispersing element was preserved for a week in a constant-temperature oven at 70° C., stimulated over time, and then a viscosity change of the pigment dispersing element was measured before and after the passage of time. A case in which a rate of change of a viscosity before and after the preservation for a week at 70° C. is less than ±10% was indicated by a symbol ○, a case in which the rate of change is ±10% or more and less than ±20% was indicated by a symbol Δ, and a case in which the rate of change is ±20% or more was indicated by a symbol x.

(Adsorption Rate of Resin (%))

15 parts of water was added to 5 parts of a prepared pigment dispersing element, and was sufficiently shaken, and then was turned at 30,000 rpm for 4 hours using an ultracentrifuge. Thereafter, a supernatant was collected, and solid content was measured to calculate a concentration of a resin in the supernatant. An adsorption rate was calculated based on the following equation.

Adsorption rate (%)=(Initial amount of input dispersant−Amount of dispersant of supernatant)×100/ Initial amount of input dispersant When an adsorption rate of a resin (%) falls below 10%, affinity between a pigment and an adsorption site of a dispersant is insufficient, and temporal stability deteriorates.

A case in which an absorbed amount of a resin of a pigment dispersing element is 10% or more was indicated by a symbol ○, and a case in which the absorbed amount is less than 10% was indicated by a symbol x.

(Manufacture of Ink)

Further, 20 parts of a pigment dispersing element, 40 parts of triethylene glycol monomethyl ether, 27.5 parts of water, and 12.5 parts of resin fine particle 1 were mixed to manufacture an ink. In this instance, 100 parts of an ink contains 4 parts of a pigment, 1.7 parts of a dispersing resin, and 5 parts of a resin fine particle.

(Measurement of Viscosity of Ink)

A viscosity of an ink was measured using an E-type viscometer ("ELD-type viscometer" manufactured by TOKI SANGYO CO., LTD) at 25° C. on condition of an engine speed 20 rpm.

(Temporal Preservation Stability of Ink)

An ink was preserved for a week in a constant-temperature oven at 70° C., stimulated over time, and then a viscosity change of the ink was measured before and after the passage of time. A case in which a rate of change of a viscosity before and after the preservation for a week at 70° C. is less than ±10% was indicated by a symbol ○, a case in which the rate of change is ±10% or more and less than ±20% was indicated by a symbol Δ, and a case in which the rate of change is ±20% or more was indicated by a symbol x.

(Print Evaluation of Ink)

A cartridge of an inkjet printer ("PM-750C" manufactured by Epson Corp.) was filled with an ink, and printing was performed on coated paper (OK topcoat+manufactured by Oji Paper Co., Ltd., paper weight in gsm 104.7 g/m²). A printed sample was observed through a magnifying glass, and connection between dots, color unevenness, and the like were evaluated. A significantly excellent printing quality was indicated by a symbol ⊚, an excellent printing quality was indicated by a symbol ○, a generally satisfactory printing quality was indicated by a symbol Δ, and a poor printing quality was indicated by a symbol x.

(Tolerance Test of Printed Material)

The printed material was rubbed with a cotton swab to which ethanol was transfused, and a tolerance test was conducted. A case in which rubbing was performed 50 times or more until an ink peels off, and a ground is exposed was indicated by ○, and a case in which the rubbing was performed less than 50 times was indicated by x.

Examples 2 to 16

A dispersing element was manufactured similarly to Example 1 except that a dispersing resin and a solvent described in Table 2 were used, and an ink was manufactured and evaluated.

Comparative Examples 1 to 6

A dispersing and a manufacture and evaluation of an ink were performed similarly to Example 1 except that a dispersing resin and a solvent described in Table 2 were used.

(Example 17) Manufacture of Dispersing Element and Manufacture of Ink 20 parts of Permanent Carmine 3810 (manufactured by Sanyo Color Works, LTD.), which is C.I. Pigment Red 269 as a pigment, 42.9 parts of dispersing resin 1, 37.1 parts of water were preliminarily dispersed by Dispar, and then a main dispersion was performed for 2 hours using DYNO-MILL having a volume of 0.6 L and filled with zirconia beads 1,800 g having a diameter of 0.5 mm, and a pigment dispersing element was obtained. In this instance, a ratio of a pigment to a non-volatile matter of a dispersing resin is pigment/dispersing resin (non-volatile matter)=7/3 (Affinity test of pigment with respect to water). 1.00% by weight of a pigment is added to water, is shaken 50 times, and is left for an hour. Thereafter, an aqueous layer is collected, and is put in a 50 mm angular cell of a turbidimeter (NDH2000, manufactured by NIPPON DENSHOKU INDUSTRIES CO., LTD). A transmittance of an aqueous layer was measured in a result of a measurement using a turbidimeter (NDH2000, manufactured by NIPPON DENSHOKU INDUSTRIES CO., LTD).

(Measurement of Viscosity of Dispersing Element)

A viscosity of a pigment dispersing element was measured using an E-type viscometer ("ELD-type viscometer" manufactured by TOKI SANGYO CO., LTD) at 25° C. on condition of an engine speed 20 rpm.

(Temporal Preservation Stability of Dispersing Element)

A pigment dispersing element was preserved for a week in a constant-temperature oven at 70° C., stimulated over time, and then a viscosity change of the pigment dispersing element was measured before and after the passage of time. A case in which a rate of change of a viscosity before and after the preservation for a week at 70° C. is less than ±10% was indicated by a symbol ○, a case in which the rate of change is ±10% or more and less than ±20% was indicated by a symbol Δ, and a case in which the rate of change is ±20% or more was indicated by a symbol x.

(Adsorption Rate of Resin (%))

15 parts of water was added to 5 parts of a prepared pigment dispersing element, and was sufficiently shaken, and then was turned at 30,000 rpm for 4 hours using an ultracentrifuge. Thereafter, a supernatant was collected, and solid content was measured to calculate a concentration of a resin in the supernatant.

An adsorption rate was calculated based on the following equation.

Adsorption rate (%)=(Initial amount of input dispersant−Amount of dispersant of supernatant)×100/ Initial amount of input dispersant When an adsorption rate of a resin (%) falls below 10%, affinity between a pigment and an adsorption site of a dispersant is insufficient, and temporal stability deteriorates.

A case in which an absorbed amount of a resin of a pigment dispersing element is 10% or more was indicated by a symbol ○, and a case in which the absorbed amount is less than 10% was indicated by a symbol x.

(Manufacture of Ink)

Further, 20 parts of a pigment dispersing element, 40 parts of triethylene glycol monomethyl ether, 27.5 parts of water, and 12.5 parts of resin fine particle 1 were mixed to manufacture an ink. In this instance, 100 parts of an ink contains 4 parts of a pigment, 1.7 parts of a dispersing resin, and 5 parts of a resin fine particle.

(Measurement of Viscosity of Ink)

A viscosity of an ink was measured using an E-type viscometer ("ELD-type viscometer" manufactured by TOKI SANGYO CO., LTD) at 25° C. on condition of an engine speed 20 rpm.

(Temporal Preservation Stability of Ink)

An ink was preserved for a week in a constant-temperature oven at 70° C., stimulated over time, and then a viscosity change of the ink was measured before and after the passage of time. A case in which a rate of change of a viscosity before and after the preservation for a week at 70° C. is less than ±10% was indicated by a symbol ○, a case in which the rate of change is ±10% or more and less than ±20% was indicated by a symbol Δ, and a case in which the rate of change is ±20% or more was indicated by a symbol x.

(Print Evaluation of Ink)

A cartridge of an inkjet printer ("PM-750C" manufactured by Epson Corp.) was filled with an ink, and printing was performed on coated paper (OK topcoat+manufactured by Oji Paper Co., Ltd., paper weight in gsm 104.7 g/m$^2$). A printed sample was observed through a magnifying glass, and connection between dots, color unevenness, and the like were evaluated. A significantly excellent printing quality was indicated by a symbol ⊚, an excellent printing quality was indicated by a symbol ⊙, a generally satisfactory printing quality was indicated by a symbol Δ, and a poor printing quality was indicated by a symbol x.

(Tolerance Test of Printed Material)

The printed material was rubbed with a cotton swab to which ethanol was transfused, and a tolerance test was conducted. A case in which rubbing was performed 50 times or more until an ink peels off, and a ground is exposed was indicated by ○, and a case in which the rubbing was performed less than 50 times was indicated by x.

Examples 17 to 20

A dispersing element was manufactured similarly to Example 17 except that a dispersing resin and a solvent described in Table 3 were used, and an ink was manufactured and evaluated.

Comparative Examples 7 to 10

A dispersing and a manufacture and evaluation of an ink were performed similarly to Example 17 except that a dispersing resin and a solvent described in Table 3 were used.

TABLE 1

| Manufacturing Example | Dispersed resin | Reaction solvent | | | | Dripping mixture | | | | |
|---|---|---|---|---|---|---|---|---|---|---|
| | | Triethylene glycol monomethyl ether | Diethylene glycol monohexyl ether | 1,2-butanediol | Butanol | Behenyl acrylate | Stearyl methacrylate | Stearyl acrylate | Lauryl methacrylate | Pentadecyl methacrylate |
| 1 | 1 | 93.4 | | | | | | | 35 | |
| 2 | 2 | | | 93.4 | | | | | 35 | |
| 3 | 3 | 93.4 | | | | | | | 35 | |
| 4 | 4 | | 93.4 | | | | | | 35 | |
| 5 | 5 | | | 93.4 | | | | | 35 | |
| 6 | 6 | 93.4 | | | | | | | 35 | |
| 7 | 7 | 93.4 | | | | | | | 47 | |
| 8 | 8 | 93.4 | | | | | | | 23 | |
| 9 | 9 | 89 | | | | | | | 35 | |
| 10 | 10 | 98.35 | | | | | | | 35 | |
| 11 | 11 | 93.4 | | | | | | | | 35 |
| 12 | 12 | 93.4 | | | | | 50 | | | |
| 13 | 13 | 93.4 | | | | | | 50 | | |
| 14 | 14 | 93.4 | | | | 35 | | | | |
| 15 | 15 | 93.4 | | | | 40 | | | | |
| Ref. 1 | Ref. 1 | 93.4 | | | | | | | 70 | |
| Ref. 2 | Ref. 2 | 93.4 | | | | | | | | |

| Manufacturing Example | Dripping mixture | | | | | | | 3 hours from completion of dripping | | Reaction temperature |
|---|---|---|---|---|---|---|---|---|---|---|
| | Styrene | α-methyl styrene | Benzyl methacrylate | Benzyl acrylate | Methacrylic acid | Acrylic acid | V-601 | V-65 | V-601 | V-65 | ° C. |
| 1 | 35 | | | | | 30 | 6 | | 0.6 | | 110° |
| 2 | 35 | | | | | 30 | 6 | | 0.6 | | 110 |
| 3 | | 35 | | | | 30 | 6 | | 0.6 | | 110 |

TABLE 1-continued

| | | | | | | | | | |
|---|---|---|---|---|---|---|---|---|---|
| 4 | | 35 | | | 30 | 6 | | 0.6 | 110 |
| 5 | | | 35 | | 30 | 6 | | 0.6 | 110 |
| 6 | 35 | | | 30 | | 6 | | 0.6 | 110 |
| 7 | 47 | | | | 6 | 6 | | 0.6 | 110 |
| 8 | 23 | | | | 54 | 6 | | 0.6 | 110 |
| 9 | 35 | | | | 30 | | 10 | 1 | 130 |
| 10 | 35 | | | | 30 | 1.5 | | 0.15 | 110 |
| 11 | 35 | | | | 30 | 6 | | 0.6 | 110 |
| 12 | 20 | | | | 30 | 6 | | 0.6 | 110 |
| 13 | 20 | | | | 30 | 6 | | 0.6 | 110 |
| 14 | 35 | | | | 30 | 6 | | 0.6 | 110 |
| 15 | 20 | | | | 40 | 6 | | 0.6 | 110 |
| Ref. 1 | | | | | 30 | 6 | | 0.6 | 110 |
| Ref. 2 | 70 | | | | 30 | 6 | | 0.6 | 110 |

| | Neutralization | | Final material | | |
|---|---|---|---|---|---|
| Manufacturing Example | Neutralization percentage % | Dimethylaminoethanol | Non-volatile matter % | Theoretical Acid value | Mw |
| 1 | 100 | 37.1 | 20 | 234 | 16000 |
| 2 | 100 | 37.1 | 20 | 234 | 16000 |
| 3 | 100 | 37.1 | 20 | 234 | 16000 |
| 4 | 100 | 37.1 | 20 | 234 | 16000 |
| 5 | 100 | 37.1 | 20 | 234 | 16000 |
| 6 | 100 | 37.1 | 20 | 196 | 16000 |
| 7 | 100 | 7.4 | 20 | 47 | 16000 |
| 8 | 100 | 66.8 | 20 | 421 | 16000 |
| 9 | 100 | 37.1 | 20 | 234 | 1500 |
| 10 | 100 | 37.1 | 20 | 234 | 35000 |
| 11 | 100 | 37.1 | 20 | 234 | 16000 |
| 12 | 100 | 37.1 | 20 | 234 | 16000 |
| 13 | 100 | 37.1 | 20 | 234 | 16000 |
| 14 | 100 | 37.1 | 20 | 234 | 16000 |
| 15 | 100 | 49.5 | 20 | 312 | 16000 |
| Ref. 1 | 100 | 37.1 | 20 | 234 | 16000 |
| Ref. 2 | 100 | 37.1 | 20 | 234 | 16000 |

V-601: Radical polymerization initiator (manufactured by WAKO PURE CHEMICAL INDUSTRIES, LTD.)
V-65: Radical polymerization initiator (manufactured by WAKO PURE CHEMICAL INDUSTRIES, LTD.)
MTG: Triethylene glycol monomethyl ether

TABLE 2

Pigment: Pigment Yellow 74

| | Dispersed resin | | | Pigment | | Manufacture of ink (part) | | | | | |
|---|---|---|---|---|---|---|---|---|---|---|---|
| Example. | Dispersed resin | Composition | Mw | Types | Transmittance (%) | Dispersing element | Water | MTG | BDG | HDG | PDO | BDO |
| 1 | 1 | LMA/St/AA = 35/35/30 | 16000 | FAST Yellow 7416 | 93.95 | 20 | 27.5 | 40 | | | | |
| 2 | 1 | ↑ | 16000 | FAST Yellow 7416 | 93.95 | 20 | 35.5 | | | 2 | 30 | |
| 3 | 2 | ↑ | 16000 | FAST Yellow 7416 | 93.95 | 20 | 33.5 | | | | | 30 |
| 4 | 3 | LMA/α-MeSt/AA = 35/35/30 | 16000 | FAST Yellow 7416 | 93.95 | 20 | 32.5 | | 5 | | 30 | |
| 5 | 4 | LMA/BzMA/AA = 35/35/30 | 16000 | FAST Yellow 7416 | 93.95 | 20 | 27.5 | | | | 30 | |
| 6 | 5 | LMA/BzA/AA = 35/35/30 | 16000 | FAST Yellow 7416 | 93.95 | 20 | 27.5 | 40 | | | | |
| 7 | 6 | LMA/St/MAA = 35/35/30 | 16000 | FAST Yellow 7416 | 93.95 | 20 | 27.5 | 40 | | | | |
| 8 | 7 | LMA/St/AA = 47/47/6 | 16000 | FAST Yellow 7416 | 93.95 | 20 | 27.5 | 40 | | | | |
| 9 | 8 | LMA/St/AA = 30/30/50 | 16000 | FAST Yellow 7416 | 93.95 | 20 | 27.5 | 40 | | | | |

TABLE 2-continued

Pigment: Pigment Yellow 74

| Example | | Polymer | MW | Pigment | | | | | | |
|---|---|---|---|---|---|---|---|---|---|---|
| 10 | 9 | LMA/St/AA = 35/35/30 | 1500 | FAST Yellow 7416 | 93.95 | 20 | 27.5 | 40 | | |
| 11 | 10 | ↑ | 35000 | FAST Yellow 7416 | 93.95 | 20 | 27.5 | 40 | | |
| 12 | 11 | PDMA/St/AA = 35/35/30 | 16000 | FAST Yellow 7416 | 93.95 | 20 | 27.5 | 40 | | |
| 13 | 1 | LMA/St/AA = 35/35/30 | 16000 | FAST Yellow 7416 | 93.95 | 20 | 30 | | 5 | 45 |
| 14 | 12 | STMA/St/AA = 50/20/30 | 16000 | FAST Yellow 7416 | 93.95 | 20 | 33.5 | | | 30 |
| 15 | 13 | SA/St/AA = 50/20/30 | 16000 | FAST Yellow 7416 | 93.95 | 20 | 32.5 | | 5 | 30 |
| 16 | 14 | VA/St/AA = 35/35/30 | 16000 | FAST Yellow 7416 | 93.95 | 20 | 27.5 | | | 30 |
| Ref. 1 | 1 | LMA/St/AA = 35/35/30 | 16000 | FAST Yellow 7416 | 93.95 | 20 | 27.5 | | | |
| Ref. 2 | Ref. 1 | LMA/AA = 70/30 | 16000 | FAST Yellow 7416 | 93.95 | 20 | 27.5 | 40 | | |
| Ref. 3 | Ref. 2 | St/AA = 70/30 | 16000 | FAST Yellow 7416 | 93.95 | 20 | 27.5 | 40 | | |
| Ref. 4 | 1 | LMA/St/AA = 35/35/30 | 16000 | HANSA Brilliant Yellow 5GX01 | 47.51 | 20 | 27.5 | 40 | | |
| Ref. 5 | 1 | ↑ | 16000 | HANSA Brilliant Yellow 5GX01 | 47.51 | 20 | 35.5 | | 2 | 30 |
| Ref. 6 | 1 | ↑ | 16000 | Paliotol Gelb | 44.63 | 20 | 35.5 | | 2 | 30 |

| | Manufacture of ink (part) | | | | Dispersing element | | | Ink | | | |
|---|---|---|---|---|---|---|---|---|---|---|---|
| Example. | HDO | 2PY | Gly | Fixing resin 1 | Viscosity | Temporal preservation stability | Adsorption rate (%) | Viscosity | Temporal preservation stability | Printing quality | Tolerance test |
| 1 | | | | 12.5 | 16 | ○ | 17 | 7.3 | ○ | ○ | ○ |
| 2 | | | | 12.5 | ↑ | ↑ | 16 | 7.1 | ○ | ⊙ | ○ |
| 3 | | 4 | | 12.5 | 24.7 | ○ | 17 | 7.1 | ○ | ○ | ○ |
| 4 | | | | 12.5 | 22.1 | ○ | 16 | 7.2 | ○ | ○ | ○ |
| 5 | 10 | | | 12.5 | 31.2 | ○ | 15 | 7.4 | ○ | ○ | ○ |
| 6 | | | | 12.5 | 28.9 | ○ | 15 | 7 | ○ | ○ | ○ |
| 7 | | | | 12.5 | 29.1 | ○ | 19 | 7.5 | ○ | ○ | ○ |
| 8 | | | | 12.5 | 80.9 | Δ | 65 | 6.8 | Δ | ○ | ○ |
| 9 | | | | 12.5 | 18.1 | ○ | 13 | 7.1 | Δ | ○ | ○ |
| 10 | | | | 12.5 | 12.1 | Δ | 17 | 6.5 | Δ | Δ | ○ |
| 11 | | | | 12.5 | 56.6 | Δ | 23 | 8.4 | Δ | ○ | ○ |
| 12 | | | | 12.5 | 26 | ○ | 20 | 7.1 | ○ | ○ | ○ |
| 13 | | | | | 26 | ○ | 19 | 7.1 | ○ | ○ | Δ |
| 14 | | 4 | | 12.5 | ↑ | ↑ | 24 | 7.6 | ○ | ○ | ○ |
| 15 | | | | 12.5 | ↑ | ↑ | 23 | 7.6 | ○ | ○ | ○ |
| 16 | 10 | | | 12.5 | ↑ | ↑ | 33 | 7.9 | ○ | ○ | ○ |
| Ref. 1 | | | 40 | 12.5 | ↑ | ↑ | 20 | 7.9 | ○ | X | ○ |
| Ref. 2 | | | | 12.5 | 31.8 | X | 16 | 9.2 | X | ○ | ○ |
| Ref. 3 | | | | 12.5 | 15.4 | ○ | 22 | 7 | X | ○ | ○ |
| Ref. 4 | | | | 12.5 | 18.3 | X | 7 | 7.2 | X | ○ | ○ |

TABLE 2-continued

| | | Pigment: Pigment Yellow 74 | | | | | | | | |
|---|---|---|---|---|---|---|---|---|---|---|
| Ref. 5 | | 12.5 | 18.4 | X | X | 6 | 7.1 | X | ○ | ○ |
| Ref. 6 | | 12.5 | 23.8 | X | X | 6 | 8.3 | X | X | ○ |

MTG: Triethylene glycol monomethyl ether

BDG: Diethylene glycol monobutyl ether

HDG: Diethylene glycol monohexyl ether

PDO: 1,2-propanediol

BDO: 1,2-butanediol

HDO: 2-methyl-2,4-pentanediol

2PY: 2-pyrrolidone

Gly: Glycerin

↑: Same as above

Need to measure: Adsorption rate increases as hydrophobicity in adsorption portion of pigment and dispersant increases. When surface coverage decreased to less than 10%, temporal stability deteriorates.

TABLE 3

| | Pigment: Pigment Red 269 | | | | | | | | | | | |
|---|---|---|---|---|---|---|---|---|---|---|---|---|
| | Dispersed resin | | | | | Manufacture of ink | | | | | | |
| Example | Dispersed resin | | Mw | Pigment Types | Transmittance | Dispersing element | Water | MTG | BDG | HDG | PDO | BDO |
| Ex. 17 | 1 | LMA/St/AA = 35/35/30 | 16000 | Permanent Carmine 3810 | 81.63 | 20 Part | 27.5 Part | 40 Part | | | | |
| Ex. 18 | 12 | STMA/St/AA = 50/20/30 | 16000 | Permanent Carmine 3810 | 81.63 | 20 Part | 35.5 Part | | | 2 Part | 30 Part | |
| Ex. 19 | ↑ | ↑ | 16000 | Permanent Carmine 3810 | 81.63 | 20 Part | 33.5 Part | | | | | 30 Part |
| Ex. 20 | 15 | VA/St/AA = 40/20/40 | 16000 | Permanent Carmine 3810 | 81.63 | 20 Part | 32.5 Part | | 5 Part | | 30 Part | |
| Ref. Ex. 7 | 1 | LMA/St/AA = 35/35/30 | 16000 | Permanent Carmine 3810 | 81.63 | 20 Part | 27.5 Part | | | | | |
| Ref. Ex. 8 | Ref. 1 | LMA/AA = 70/30 | 16000 | Permanent Carmine 3810 | 81.63 | 20 Part | 27.5 Part | 40 Part | | | | |
| Ref. Ex. 9 | Ref. 2 | St/AA = 70/30 | 16000 | Permanent Carmine 3810 | 81.63 | 20 Part | 27.5 Part | 40 Part | | | | |
| Ref. Ex. 10 | 1 | LMA/St/AA = 35/35/30 | 16000 | Fastogen Super Red 7066B(PV19) | 42.56 | 20 Part | 27.5 Part | 40 Part | | | | |

| | Manufacture of ink | | | | Dispersing element | | | Ink | | | |
|---|---|---|---|---|---|---|---|---|---|---|---|
| Example | HDO | 2PY | Gly | Fising resin 1 | Viscosity | Temporal preservation stability | Adsorption rate (%) | Viscosity | Temporal preservation stability | Printing quality | Tolerance test |
| Ex. 17 | | | | 12.5 Part | 17 | ○ | ○ | 22 | 7.2 | ○ | ○ | ○ |
| Ex. 18 | | | | 12.5 Part | 16 | ⊙ | ○ | 20 | 7.3 | ⊙ | ○ | ○ |
| Ex. 19 | | 4 Part | | 12.5 Part | ↑ | ↑ | ○ | 23 | 7.8 | ○ | ⊙ | ○ |
| Ex. 20 | | | | 12.5 Part | 15.8 | ↑ | ○ | 26 | 7 | ⊙ | ○ | ○ |
| Ref. Ex. 7 | | | 40 Part | 12.5 Part | 17 | ↑ | ○ | 20 | 7.8 | ○ | X | ○ |
| Ref. Ex. 8 | | | | 12.5 Part | 25.1 | X | ○ | 16 | 9.4 | X | ○ | ○ |
| Ref. Ex. 9 | | | | 12.5 Part | 24.5 | ○ | ○ | 32 | 7.2 | X | ○ | ○ |

TABLE 3-continued

| | | | | | | | | | | |
|---|---|---|---|---|---|---|---|---|---|---|
| | | | | Pigment: Pigment Red 269 | | | | | | |
| Ref. Ex. 10 | 12.5 Part | 18.3 | X | X | 6 | 7.2 | X | ◯ | ◯ |

MTG: Triethylene glycol monomethyl ether
BDG: Diethylene glycol monobutyl ether
HDG: Diethylene glycol monohexyl ether
PDO: 1,2-propanediol
BDO: 1,2-butanediol
HDO: 2-methyl-2,4-pentanediol
2PY: 2-pyrrolidone
Gly: Glycerin
↑: Same as above
PK Water/1.3-PD/MTG/BDG = 55/3/37/5
TKT Water/1.3-PD/MTG/BDG = 46/49/2/2
BDG Water/1.3-PD/MTG/BDG = 55/3/21/21

Embodiment II (Manufacturing Example 1) Synthesis of Dispersing Resin 1

93.4 parts of triethylene glycol monomethyl ether was put in a reaction container including a gas introduction pipe, a thermometer, a condenser, and a stirrer, and replacement by nitrogen gas was performed. An inside of the reaction container was heated to 110° C., a mixture of 35.0 parts of behenyl methacrylate, 35.0 parts of styrene, 30.0 parts of acrylic acid, and 6.0 parts of V-601 (manufactured by Wako Pure Chemical Industries, Ltd.) was dripped for 2 hours, and a polymerization reaction was conducted. After the dripping was completed, the reaction was further conducted at 110° C. for 3 hours, and then 0.6 parts of V-601 (manufactured by Wako Pure Chemical Industries, Ltd.) was added, and the reaction was further continued at 110° C. for an hour to obtain a solution of dispersing resin 1. A weight-average molecular weight of dispersing resin 1 was about 16,000. Further, cooling was performed up to room temperature, and then 37.1 parts of dimethylaminoethanol was added, and neutralization was conducted. The amount corresponds to an amount at which acrylic acid is 100% neutralized. Further, 200 parts of water was added to form an aqueous solution. 1 g of sample was taken, the sample was heated and dried at 180° C. for 20 minutes to measure a non-volatile matter, and water was added so that a non-volatile matter of the aqueous resin solution corresponds to 20%. In this way, an aqueous solution in which a non-volatile matter corresponds to 20% of dispersing resin 1 was obtained.

(Manufacturing Example 2) Synthesis of Dispersing Resin 2

93.4 parts of butanol was put in a reaction container including a gas introduction pipe, a thermometer, a condenser, and a stirrer, and replacement by nitrogen gas was performed. An inside of the reaction container was heated to 110° C., a mixture of 35.0 parts of behenyl methacrylate, 35.0 parts of styrene, 30.0 parts of acrylic acid, and 6.0 parts of V-601 (manufactured by Wako Pure Chemical Industries, Ltd.) was dripped for 2 hours, and a polymerization reaction was conducted. After the dripping was completed, the reaction was further conducted at 110° C. for 3 hours, and then 0.6 parts of V-601 (manufactured by Wako Pure Chemical Industries, Ltd.) was added, and the reaction was further continued at 110° C. for an hour to obtain a solution of dispersing resin 2. A weight-average molecular weight of dispersing resin 2 was about 16,000. Further, cooling was performed up to room temperature, and then 37.1 parts of dimethylaminoethanol was added, and neutralization was conducted. The amount corresponds to an amount at which acrylic acid is 100% neutralized. Further, 200 parts of water was added to form an aqueous solution, and then the aqueous solution was heated to 90° C. or more, and azeotropic removal of butanol was conducted from the mixture of butanol and water. In response to an internal temperature reaching 100° C., 1 g of sample was taken, the sample was heated and dried at 180° C. for 20 minutes to measure a non-volatile matter, and water was added so that a non-volatile matter of the aqueous resin solution corresponds to 20%. In this way, an aqueous solution excluding an organic solvent in which a non-volatile matter corresponds to 20% of dispersing resin 2 was obtained.

Manufacturing Examples 3 to 15

Synthesis was performed similarly to Manufacturing Example 1 except that a material, an input amount, and a reaction temperature described in Table 1 were used, and solutions of dispersing resin 3 to 15 were obtained. Further, dimethylaminoethanol was added to achieve 100% neutralization, an aqueous solution was formed similarly to Manufacturing Example 1, and aqueous solutions of dispersing resin 3 to 15 were obtained.

Comparative Manufacturing Examples 1 and 2

Synthesis was performed similarly to Manufacturing Example 1 except that a material, an input amount, and a reaction temperature described in Table 1 were used, and solutions of comparative dispersing resin 1 and 2 were obtained. Further, dimethylaminoethanol was added to achieve 100% neutralization, an aqueous solution was formed similarly to Manufacturing Example 1, and aqueous solutions of comparative dispersing resin 1 and 2 were obtained.

(Manufacturing Example of Resin Fine Particle)

40 parts of ion-exchanged water and 0.2 parts of AKUA-RON KH-10 (manufactured by DAI-ICHI KOGYO SEI-YAKU CO., LTD.) as a surfactant were put in a reaction container including an agitator, a thermometer, a dropping funnel, and a reflux apparatus, and 1% of a pre-emulsion in which 40 parts of 2-ethyl hexyl acrylate, 50 parts of methyl methacrylate, 7 parts of styrene, 2 parts of dimethylacrylamide, 1 part of methacrylic acid, 53 parts of ion-exchanged water, and 1.8 parts of AKUARON KH-10 (manufactured by DAI-ICHI KOGYO SEIYAKU CO., LTD.) as a surfactant were mixed in advance was further separately added. An internal temperature was increased to 60° C., replacement by nitrogen gas was sufficiently performed, and then 10% of 10 parts of a 5% aqueous solution of potassium persulfate and 20 parts of 1% aqueous solution of anhydrous sodium bisulfite were added, and polymerization was started. An inside of a reaction system was maintained at 60° C. for 5 minutes, and then a remainder of a pre-emulsion, and a remainder of a 5% aqueous solution of potassium persulfate and a 1% aqueous solution of anhydrous sodium bisulfite were dripped for 1.5 hours while an internal temperature was maintained at 60° C., and agitation was further continued for 2 hours. After verifying that an inversion rate exceeds 98% through a measurement of solid content, a temperature was cooled down up to 30° C. Diethylaminoethanol was added to set a pH value to 8.5, and solid content was adjusted to 40% using ion-exchanged water to obtain a resin fine particle water dispersion. The solid content was searched for using a baking residue at 150° C. for 20 minutes. The obtained resin fine particle water dispersion was set to resin fine particle 1.

(Example 1) Manufacture of Dispersing Element and Manufacture of Ink 34.3 parts of Symuler Super Magenta RGT (manufactured by DIC), which is Pigment Red 122 as a pigment, 42.9 parts of dispersing resin 1, and 37.1 parts of water were preliminarily dispersed by Dispar, and then a main dispersion was performed for 2 hours using DYNO-MILL having a volume of 0.6 L and filled with 1,800 g of zirconia beads having a diameter of 0.5 mm, and a pigment dispersing element was obtained. In this instance, a ratio of a pigment to a non-volatile matter of a dispersing resin is pigment/dispersing resin (non-volatile matter)=4/1.

(Affinity Test of Pigment with Respect to Water)

1.00% by weight of pigment is added to water, is shaken 50 times, and is left for an hour. Thereafter, an aqueous layer is collected, and is put in a 50 mm angular cell of a turbidimeter (NDH2000, manufactured by NIPPON DENSHOKU INDUSTRIES CO., LTD). A transmittance of an aqueous layer was measured in a result of a measurement using a turbidimeter (NDH2000, manufactured by NIPPON DENSHOKU INDUSTRIES CO., LTD).

(Measurement of Viscosity of Dispersing Element)

A viscosity of a pigment dispersing element was measured using an E-type viscometer ("ELD-type viscometer" manufactured by TOKI SANGYO CO., LTD) at 25° C. on condition of an engine speed 20 rpm.

(Temporal Preservation Stability of Dispersing Element)

A pigment dispersing element was preserved for a week in a constant-temperature oven at 70° C., stimulated over time, and then a viscosity change of the pigment dispersing element was measured before and after the passage of time. A case in which a rate of change of a viscosity before and after the preservation for a week at 70° C. is less than ±10% was indicated by a symbol ○, a case in which the rate of change is ±10% or more and less than ±20% was indicated by a symbol Δ, and a case in which the rate of change is ±20% or more was indicated by a symbol x.

(Manufacture of Ink)

Further, 20 parts of a pigment dispersing element, 40 parts of triethylene glycol monomethyl ether, 27.5 parts of water, and 12.5 parts of resin fine particle 1 were mixed to manufacture an ink. In this instance, 100 parts of an ink contains 4 parts of a pigment, 1.7 parts of a dispersing resin, and 5 parts of a resin fine particle.

(Measurement of Viscosity of Ink)

A viscosity of an ink was measured using an E-type viscometer ("ELD-type viscometer" manufactured by TOKI SANGYO CO., LTD) at 25° C. on condition of an engine speed 20 rpm.

(Temporal Preservation Stability of Ink)

An ink was preserved for a week in a constant-temperature oven at 70° C., stimulated over time, and then a viscosity change of the ink was measured before and after the passage of time. A case in which a rate of change of a viscosity before and after the preservation for a week at 70° C. is less than ±10% was indicated by a symbol ○, a case in which the rate of change is ±10% or more and less than ±20% was indicated by a symbol Δ, and a case in which the rate of change is ±20% or more was indicated by a symbol x.

(Adsorption Rate of Resin)

20 parts of a prepared ink was turned at 30,000 rpm for 4 hours using an ultracentrifuge. Thereafter, a supernatant was collected, and solid content was measured to calculate a concentration of a resin in the supernatant. An adsorption rate was calculated based on the following equation.

Adsorption rate (%)=(Initial amount of input dispersant−Amount of resin of supernatant)×100/Initial amount of input dispersant (Print Evaluation of Ink)

A cartridge of an inkjet printer ("PM-750C" manufactured by Epson Corp.) was filled with an ink, and printing was performed on coated paper (OK topcoat+manufactured by Oji Paper Co., Ltd., paper weight in gsm 104.7 g/m$^2$). A printed sample was observed through a magnifying glass, and connection between dots, color unevenness, and the like were evaluated. A significantly excellent printing quality was indicated by a symbol ⊚, an excellent printing quality was indicated by a symbol ○, a generally satisfactory printing quality was indicated by a symbol Δ, and a poor printing quality was indicated by a symbol x.

(Tolerance Test of Printed Material)

The printed material was rubbed with a cotton swab to which ethanol was transfused, and a tolerance test was conducted. A case in which rubbing was performed 50 times or more until an ink peels off, and a ground is exposed was indicated by ○, and a case in which the rubbing was performed less than 50 times was indicated by x.

(Weather Resistance Test of Printed Material)

A weather resistance test was conducted using super xenon weather meter SX 75 (manufactured by Suga Test Instruments Co., Ltd.) for 600 hours on a sample printed using PVC as a printing base material on condition of an irradiance 160 W, bp 53° C., 50% RH, irradiation+rainfall cycle mode (1 cycle 120 minutes, within 18 minutes rainfall), and a concentration change before and after the test was evaluated.

○: OD value decreasing rate is less than 10%
x: OD value decreasing rate is 10% or more Examples 2 to 17

A dispersing element was manufactured similarly to Example 1 except that a dispersing resin and a solvent described in Table 2 were used, and an ink was manufactured and evaluated.

Comparative Examples 1 to 5

A dispersing and a manufacture and evaluation of an ink were performed similarly to Example 1 except that a dispersing resin and a solvent described in Table 2 were used.

TABLE 1

| Manufacturing Example | Dispersed resin | Reaction solvent | | | | Dripping mixture | | | | |
|---|---|---|---|---|---|---|---|---|---|---|
| | | Triethylene glycol monomethyl ether | Diethylene glycol monohexyl ether | 1,2-butanediol | Butanol | Behenyl acrylate | Behenyl methacrylate | Stearyl acrylate | Stearyl methacrylate | Lauryl methacrylate |
| Ex. 1 | 1 | 93.4 | | | | 35 | | | | |
| Ex. 2 | 2 | | | | 93.4 | 35 | | | | |
| Ex. 3 | 3 | 93.4 | | | | | 35 | | | |
| Ex. 4 | 4 | | 93.4 | | | 35 | | | | |
| Ex. 5 | 5 | | | 93.4 | | 35 | | | | |
| Ex. 6 | 6 | 93.4 | | | | 35 | | | | |
| Ex. 7 | 7 | 93.4 | | | | 47 | | | | |
| Ex. 8 | 8 | 93.4 | | | | 23 | | | | |
| Ex. 9 | 9 | 89 | | | | 35 | | | | |
| Ex. 10 | 10 | 98.35 | | | | 35 | | | | |
| Ex. 11 | 11 | 93.4 | | | | | | | 35 | |
| Ex. 12 | 12 | 93.4 | | | | 50 | | | | |
| Ex. 13 | 13 | 93.4 | | | | | | | | 50 |
| Ex. 14 | 14 | 93.4 | | | | | | 35 | | |
| Ex. 15 | 15 | 93.4 | | | | 40 | | | | |
| Ref. Ex. 1 | Ref. 1 | 93.4 | | | | | | | | 70 |
| Ref. Ex. 2 | Ref. 2 | 93.4 | | | | | | | | |

| Manufacturing Example | Dripping mixture | | | | | | | | 3 hours form completion of dripping | | Reaction temperature |
|---|---|---|---|---|---|---|---|---|---|---|---|
| | Styrene | α-methyl styrene | Benzyl methacrylate | Benzyl acrylate | Methacrylic acid | Acrylic acid | V-601 | V-65 | V-601 | V-65 | |
| Ex. 1 | 35 | | | | | 30 | 6 | | 0.6 | | 110° C. |
| Ex. 2 | 35 | | | | | 30 | 6 | | 0.6 | | 110° C. |
| Ex. 3 | | 35 | | | | 30 | 6 | | 0.6 | | 110° C. |
| Ex. 4 | | | 35 | | | 30 | 6 | | 0.6 | | 110° C. |
| Ex. 5 | | | | 35 | | 30 | 6 | | 0.6 | | 110° C. |
| Ex. 6 | 35 | | | | 30 | | 6 | | 0.6 | | 110° C. |
| Ex. 7 | 47 | | | | | 6 | 6 | | 0.6 | | 110° C. |
| Ex. 8 | 23 | | | | | 54 | 6 | | 0.6 | | 110° C. |
| Ex. 9 | 35 | | | | | 30 | | 10 | | 1 | 130° C. |
| Ex. 10 | 35 | | | | | 30 | 1.5 | | 0.15 | | 110° C. |
| Ex. 11 | 35 | | | | | 30 | 6 | | 0.6 | | 110° C. |
| Ex. 12 | 20 | | | | | 30 | 6 | | 0.6 | | 110° C. |
| Ex. 13 | 20 | | | | | 30 | 6 | | 0.6 | | 110° C. |
| Ex. 14 | 35 | | | | | 30 | 6 | | 0.6 | | 110° C. |
| Ex. 15 | 20 | | | | | 40 | 6 | | 0.6 | | 110° C. |
| Ref. Ex. 1 | | | | | | 30 | 6 | | 0.6 | | 110° C. |
| Ref. Ex. 2 | 70 | | | | | 30 | 6 | | 0.6 | | 110° C. |

| Manufacturing Example | Neutralization | | Final material Non-volatile matter | Theoretical acid value | Mw |
|---|---|---|---|---|---|
| | Neutralization perceptage | Dimethylaminoethanol | | | |
| Ex. 1 | 100% | 37.1 | 20% | 234 | 16000 |
| Ex. 2 | 100% | 37.1 | 20% | 234 | 16000 |
| Ex. 3 | 100% | 37.1 | 20% | 234 | 16000 |
| Ex. 4 | 100% | 37.1 | 20% | 234 | 16000 |
| Ex. 5 | 100% | 37.1 | 20% | 234 | 16000 |
| Ex. 6 | 100% | 31.1 | 20% | 196 | 16000 |
| Ex. 7 | 100% | 7.4 | 20% | 47 | 16000 |
| Ex. 8 | 100% | 66.8 | 20% | 421 | 16000 |
| Ex. 9 | 100% | 37.1 | 20% | 234 | 1500 |
| Ex. 10 | 100% | 37.1 | 20% | 234 | 35000 |
| Ex. 11 | 100% | 37.1 | 20% | 234 | 16000 |
| Ex. 12 | 100% | 37.1 | 20% | 234 | 16000 |
| Ex. 13 | 100% | 37.1 | 20% | 234 | 16000 |
| Ex. 14 | 100% | 37.1 | 20% | 234 | 16000 |
| Ex. 15 | 100% | 49.5 | 20% | 312 | 16000 |

TABLE 1-continued

|  |  |  |  |  |  |
|---|---|---|---|---|---|
| Ref. Ex. 1 |  | 100% | 37.1 | 20% | 234 | 16000 |
| Ref. Ex. 2 |  | 100% | 37.1 | 20% | 234 | 16000 |

V-601: Radical polymerization initiator (manufactured by WAKO PURE CHEMICAL INDUSTRIES, LTD.)
V-65: Radical polymerization initiator (manufactured by WAKO PURE CHEMICAL INDUSTRIES, LTD.)
MTG: Triethylene glycol monomethyl ether
HDG: Diethylene glycol monohexyl ether
BDO: 1,2-butanediol

TABLE 2

Pigment: Pigment Red 122

| Example | Dispersed resin | Composition | Mw | Pigment Types | Transmittance | Dispersing element | Water | MTG | BDG | HDG | PDO | BDO |
|---|---|---|---|---|---|---|---|---|---|---|---|---|
| Ex. 1 | 1 | VA/St/AA = 35/35/30 | 16000 | Symuler Super Magenta RGT | 55.75 | 20 Part | 27.5 Part | 40 Part |  |  |  |  |
| Ex. 2 | 1 | ↑ | 16000 | ↑ | 55.75 | 20 Part | 35.5 Part |  |  | 2 Part | 30 Part |  |
| Ex. 3 | 2 | ↑ | 16000 | ID120 | 4.75 | 20 Part | 33.5 Part |  |  |  |  | 30 Part |
| Ex. 4 | 3 | VMA/α-MeSt/AA = 35/35/30 | 16000 | Symuler Super Magenta RGT | 55.75 | 20 Part | 32.5 Part |  | 5 Part |  | 30 Part |  |
| Ex. 5 | 4 | VA/BzMA/AA = 35/35/30 | 16000 | ↑ | 55.75 | 20 Part | 27.5 Part |  |  |  | 30 Part |  |
| Ex. 6 | 5 | VA/BzA/AA = 35/35/30 | 16000 | ↑ | 55.75 | 20 Part | 27.5 Part | 40 Part |  |  |  |  |
| Ex. 7 | 6 | VA/St/MAA = 35/35/30 | 16000 | ↑ | 55.75 | 20 Part | 27.5 Part | 40 Part |  |  |  |  |
| Ex. 8 | 7 | VA/St/AA = 47/47/6 | 16000 | ↑ | 55.75 | 20 Part | 27.5 Part | 40 Part |  |  |  |  |
| Ex. 9 | 8 | VA/St/AA = 23/23/54 | 16000 | ↑ | 55.75 | 20 Part | 27.5 Part | 40 Part |  |  |  |  |
| Ex. 10 | 9 | VA/St/AA = 35/35/30 | 1500 | ↑ | 55.75 | 20 Part | 27.5 Part | 40 Part |  |  |  |  |
| Ex. 11 | 10 | ↑ | 35000 | ↑ | 55.75 | 20 Part | 27.5 Part | 40 Part |  |  |  |  |
| Ex. 12 | 11 | STMA/St/AA = 35/35/30 | 16000 | ↑ | 55.75 | 20 Part | 27.5 Part | 40 Part |  |  |  |  |
| Ex. 13 | 1 | VA/St/AA = 35/35/30 | 16000 | ↑ | 55.75 | 20 Part | 30 Part |  | 5 Part |  | 45 Part |  |
| Ex. 14 | 12 | VA/St/AA = 50/20/30 | 16000 | ↑ | 55.75 | 20 Part | 33.5 Part |  |  |  | 30 Part |  |
| Ex. 15 | 13 | LMA/St/AA = 50/20/30 | 16000 | ↑ | 55.75 | 20 Part | 32.5 Part |  | 5 Part |  | 30 Part |  |
| Ex. 16 | 14 | SA/St/AA = 50/20/30 | 16000 | ↑ | 55.75 | 20 Part | 27.5 Part |  |  |  | 30 Part |  |
| Ex. 17 | 15 | VA/St/AA = 40/20/40 | 16000 | ↑ | 55.75 | 20 Part | 33.5 Part |  |  |  |  | 30 Part |
| Ref. Ex. 1 | 1 | VA/St/AA = 35/35/30 | 16000 | ↑ | 55.75 | 20 Part | 27.5 Part |  |  |  |  |  |
| Ref. Ex. 2 | Ref. 1 | LMA/AA = 70/30 | 16000 | ↑ | 55.75 | 20 Part | 27.5 Part | 40 Part |  |  |  |  |
| Ref. Ex. 3 | Ref. 2 | St/AA = 70/30 | 16000 | ↑ | 55.75 | 20 Part | 27.5 Part | 40 Part |  |  |  |  |
| Ref. Ex. 4 | 1 | VA/St/AA = 35/35/30 | 16000 | Quindo Violet BH-201(PB19) | 85.25 | 20 Part | 27.5 Part | 40 Part |  |  |  |  |
| Ref. Ex. 5 | 1 | ↑ | 16000 | ↑ | 85.25 | 20 Part | 35.5 Part |  |  | 2 Part | 30 Part |  |

| Example | Manufacture of ink HDO | 2PY | Gly | Fixing resin 1 | Dispersing element Viscosity | Temporal preservation stability | Adsorption rate (%) | Ink Viscosity | Temporal preservation stability | Printing quality | Tolerance test | Weather resistance test |
|---|---|---|---|---|---|---|---|---|---|---|---|---|
| Ex. 1 |  |  |  | 12.5 Part | 16 | ○ | 35 | 7.3 | ○ | ○ | ○ | ○ |
| Ex. 2 |  |  |  | 12.5 Part | ↑ | ○ | 36 | 7.1 | ○ | ⊙ | ○ | ○ |
| Ex. 3 |  | 4 Part |  | 12.5 Part | 24.7 | ○ | 35 | 7.1 | ○ | ○ | ○ | ○ |

TABLE 2-continued

| | | | | Pigment: Pigment Red 122 | | | | | | | |
|---|---|---|---|---|---|---|---|---|---|---|---|
| Ex. 4 | | | 12.5 Part | 22.1 | ○ | 33 | 7.2 | ○ | ○ | ○ | ○ |
| Ex. 5 | 10 Part | | 12.5 Part | 31.2 | ○ | 34 | 7.4 | ○ | ○ | ○ | ○ |
| Ex. 6 | | | 12.5 Part | 28.9 | ○ | 36 | 7 | ○ | ○ | ○ | ○ |
| Ex. 7 | | | 12.5 Part | 29.1 | ○ | 40 | 7.5 | ○ | ○ | ○ | ○ |
| Ex. 8 | | | 12.5 Part | 80.9 | Δ | 75 | 6.8 | Δ | ○ | ○ | ○ |
| Ex. 9 | | | 12.5 Part | 18.1 | ○ | 15 | 7.1 | Δ | ○ | ○ | ○ |
| Ex. 10 | | | 12.5 Part | 12.1 | Δ | 22 | 6.5 | Δ | Δ | ○ | ○ |
| Ex. 11 | | | 12.5 Part | 56.6 | Δ | 24 | 8.4 | Δ | ○ | ○ | ○ |
| Ex. 12 | | | 12.5 Part | 26 | ○ | 40 | 7.1 | ○ | ○ | ○ | ○ |
| Ex. 13 | | | | 26 | ○ | 35 | 7.1 | ○ | ○ | Δ | ○ |
| Ex. 14 | | 4 Part | 12.5 Part | ↑ | ○ | 38 | 7.6 | ○ | ○ | ○ | ○ |
| Ex. 15 | | | 12.5 Part | ↑ | ○ | 25 | 7.6 | ○ | ○ | ○ | ○ |
| Ex. 16 | 10 Part | | 12.5 Part | ↑ | ○ | 43 | 7.9 | ○ | ○ | ○ | ○ |
| Ex. 17 | | 4 Part | 12.5 Part | ↑ | ○ | 33 | 8 | ○ | ○ | ○ | ○ |
| Ref. Ex. 1 | | 40 Part | 12.5 Part | ↑ | ○ | 35 | 7.9 | ○ | X | ○ | ○ |
| Ref. Ex. 2 | | | 12.5 Part | 31.8 | X | 23 | 9.2 | X | ○ | ○ | ○ |
| Ref. Ex. 3 | | | 12.5 Part | 15.4 | ○ | 20 | 7 | X | ○ | ○ | ○ |
| Ref. Ex. 4 | | | 12.5 Part | 18.3 | X | 6 | 7.2 | X | ○ | ○ | X |
| Ref. Ex. 5 | | | 12.5 Part | 18.4 | X | 7 | 7.1 | X | ○ | ○ | X |

MTG: Triethylene glycol monomethyl ether
BDG: Diethylene glycol monobutyl ether
HDG: Diethylene glycol monohexyl ether
PDO: 1,2-propanediol
BDO: 1,2-butanediol
HDO: 2-methyl-2,4-pentanediol
2PY: 2-pyrrolidone
Gly: Glycerin
↑: Same as above Embodiment III (Manufacturing Example 1) Synthesis of Dispersing Resin 1

93.4 parts of triethylene glycol monomethyl ether was put in a reaction container including a gas introduction pipe, a thermometer, a condenser, and a stirrer, and replacement by nitrogen gas was performed. An inside of the reaction container was heated to 110° C., a mixture of 35.0 parts of behenyl methacrylate, 35.0 parts of styrene, 30.0 parts of acrylic acid, and 6.0 parts of V-601 (manufactured by Wako Pure Chemical Industries, Ltd.) was dripped for 2 hours, and a polymerization reaction was conducted. After the dripping was completed, the reaction was further conducted at 110° C. for 3 hours, and then 0.6 parts of V-601 (manufactured by Wako Pure Chemical Industries, Ltd.) was added, and the reaction was further continued at 110° C. for an hour to obtain a solution of dispersing resin 1. A weight-average molecular weight of dispersing resin 1 was about 16,000. Further, cooling was performed up to room temperature, and then 37.1 parts of dimethylaminoethanol was added, and neutralization was conducted. The amount corresponds to an amount at which acrylic acid is 100% neutralized. Further, 200 parts of water was added to form an aqueous solution. 1 g of sample was taken, the sample was heated and dried at 180° C. for 20 minutes to measure a non-volatile matter, and water was added so that a non-volatile matter of the aqueous resin solution corresponds to 20%. In this way, an aqueous solution in which a non-volatile matter corresponds to 20% of dispersing resin 1 was obtained.

(Manufacturing Example 2) Synthesis of Dispersing Resin 2

93.4 parts of butanol was put in a reaction container including a gas introduction pipe, a thermometer, a condenser, and a stirrer, and replacement by nitrogen gas was performed. An inside of the reaction container was heated to 110° C., a mixture of 35.0 parts of behenyl methacrylate, 35.0 parts of styrene, 30.0 parts of acrylic acid, and 6.0 parts of V-601 (manufactured by Wako Pure Chemical Industries, Ltd.) was dripped for 2 hours, and a polymerization reaction was conducted. After the dripping was completed, the reaction was further conducted at 110° C. for 3 hours, and then 0.6 parts of V-601 (manufactured by Wako Pure Chemical Industries, Ltd.) was added, and the reaction was further continued at 110° C. for an hour to obtain a solution of dispersing resin 2. A weight-average molecular weight of dispersing resin 2 was about 16,000.

Further, cooling was performed up to room temperature, and then 37.1 parts of dimethylaminoethanol was added, and neutralization was conducted. The amount corresponds to an amount at which acrylic acid is 100% neutralized. Further, 200 parts of water was added to form an aqueous solution, and then the aqueous solution was heated to 90° C. or more, and azeotropic removal of butanol was conducted from the mixture of butanol and water. In response to an internal temperature reaching 100° C., 1 g of sample was taken, the sample was heated and dried at 180° C. for 20 minutes to measure a non-volatile matter, and water was added so that a non-volatile matter of the aqueous resin solution corresponds to 20%. In this way, an aqueous solution excluding an organic solvent in which a non-volatile matter corresponds to 20% of dispersing resin 2 was obtained.

Manufacturing Examples 3 to 15, and Comparative Manufacturing Examples 1 to 7

Synthesis was performed similarly to Manufacturing Example 1 except that a material, an input amount, and a reaction temperature described in Table 1 were used, and solutions of dispersing resin 3 to 15, and comparative dispersing resins 1 to 7 were obtained. Further, dimethylaminoethanol was added to achieve 100% neutralization, an aqueous solution was formed similarly to Manufacturing Example 1, and aqueous solutions of dispersing resin 3 to 15, and comparative dispersing resins 1 to 7 were obtained.

(Manufacturing Example of Resin Fine Particle)

40 parts of ion-exchanged water and 0.2 parts of AKUARON KH-10 (manufactured by DAI-ICHI KOGYO SEIYAKU CO., LTD.) as a surfactant were put in a reaction container including an agitator, a thermometer, a dropping funnel, and a reflux apparatus, and 1% of a pre-emulsion in which 10 parts of 2-ethyl hexyl acrylate, 57 parts of methyl methacrylate, 30 parts of styrene, 2 parts of dimethylacrylamide, 1 part of methacrylic acid, 53 parts of ion-exchanged water, and 1.8 parts of AKUARON KH-10 (manufactured by DAI-ICHI KOGYO SEIYAKU CO., LTD.) as a surfactant were mixed in advance was further separately added. An internal temperature was increased to 60° C., replacement by nitrogen gas was sufficiently performed, and then 10% of 10 parts of 5% aqueous solution of potassium persulfate and 20 parts of 1% aqueous solution of anhydrous sodium bisulfite were added, and polymerization was started. An inside of a reaction system was maintained at 60° C. for 5 minutes, and then a remainder of a pre-emulsion, and a remainder of a 5% aqueous solution of potassium persulfate and a 1% aqueous solution of anhydrous sodium bisulfite were dripped for 1.5 hours while an internal temperature was maintained at 60° C., and agitation was further continued for 2 hours. After verifying that an inversion rate exceeds 98% through a measurement of solid content, a temperature was cooled down up to 30° C. Diethylaminoethanol was added to set a pH value to 8.5, and solid content was adjusted to 40% using ion-exchanged water to obtain a resin fine particle water dispersion. The solid content was searched for using a baking residue at 150° C. for 20 minutes. The obtained resin fine particle water dispersion was set to resin fine particle 1. A calculated glass transition point temperature of resin fine particle 1 is 80° C.

(Example 1) Manufacture of Dispersing Element and Manufacture of Ink 20 parts of Pigment Yellow 150 as a pigment, 20 parts of dispersing resin 1, 60 parts of water were preliminarily dispersed by Dispar, and then a main dispersion was performed for 2 hours using DYNO-MILL having a volume of 0.6 L and filled with 1,800 g of zirconia beads having a diameter of 0.5 mm, and a pigment dispersing element was obtained. In this instance, a ratio of a pigment to a non-volatile matter of a dispersing resin is pigment/dispersing resin (non-volatile matter)=5/1. Further, 20 parts of a pigment dispersing element, 35 parts of triethylene glycol monomethyl ether, 5 parts of diethylene glycol monobutyl ether, and 40 parts of water were mixed, and an ink was manufactured.

Examples 2 to 18, and Comparative Examples 1 to 16

A dispersing element was manufactured similarly to Example 1 except that a dispersing resin, a pigment, and a solvent described in Table 2 were used, and an ink was manufactured and evaluated.

Examples 16 to 31

A dispersing element was prepared similarly to Example 1 using a dispersing resin described in Table 2, and 20 parts of a pigment dispersing element, a solvent described in Table 2, and 20 parts of a resin fine particle were mixed, and an ink was prepared.

(Evaluation of Preservation Stability)

A viscosity of a prepared ink was measured using an E-type viscometer (TVE-20L manufactured by TOKI SANGYO CO., LTD) at 25° C. on condition of an engine speed 50 rpm. The ink was preserved in a constant-temperature oven at 70° C., stimulated over time, and then a viscosity change of the ink was evaluated before and after the passage of time. Evaluation criteria are as below, and evaluations A, B, and C correspond to practicable ranges.

A: A rate of change of a viscosity after preservation for 4 weeks is less than ±10%.

B: A rate of change of a viscosity after preservation for 2 weeks is less than ±10%.

C: A rate of change of a viscosity after preservation for 1 week is less than ±10%.

D: A rate of change of a viscosity after preservation for 1 week is ±10 to 20%.

E: A rate of change of a viscosity after preservation for 1 week is ±20% or more.

(Preparation of Printed Material)

Solvent ink inkjet printer Color Painter 64SPlus manufactured by Seiko I Infotech Inc. was filled with the manufactured inkjet yellow ink under a circumstance of 25° C., and an image was printed while a base material is heated to 50° C. After the ink was applied to the base material, heating and drying was performed at 80° C. for 3 minutes, and a printed material for evaluation was obtained. A weather resistance evaluation, verification of a printing quality, and a tolerance test were conducted using the printed material.

(Discharging Characteristic)

A solid printing of 1 m×1 m was performed by the printer, a nozzle check pattern was printed before and after the printing to count the number of nozzle-outs, and an evaluation was conducted using the number.

○: No nozzle-out

Δ: 1 to 10 nozzle-outs x: 11 or more nozzle-outs (Weather Resistance)

A weather resistance test was conducted using super xenon weather meter SX 75 (manufactured by Suga Test Instruments Co., Ltd.) for 600 hours on a sample printed using PVC as a printing base material on condition of an irradiance 160 W, bp 53° C., 50% RH, irradiation and rainfall cycle mode (1 cycle 120 minutes, within 18 minutes rainfall), and a concentration change before and after the test was evaluated. A concentration was measured using 528 spectral concentration meter manufactured by X-Rite.

○: OD value decreasing rate is less than 10%
x: OD value decreasing rate is 10% or more (Printing Quality)

A printed sample was observed through a magnifying glass for the base material below, and connection between dots, color unevenness, and the like were evaluated. A significantly excellent printing quality was indicated by a symbol ⊚, an excellent printing quality was indicated by a symbol ○, a generally satisfactory printing quality was indicated by a symbol Δ, and a poor printing quality was indicated by a symbol x.

Coated paper: OK topcoat+manufactured by Oji Paper Co., Ltd.

PVC: MD-5 manufactured by Metamark (Tolerance Test)

A sample printed using PVC as a printing base material was rubbed with a cotton swab to which ethanol was transfused, and a tolerance test was conducted. A case in which rubbing was performed 51 times or more until an ink peels off, and a ground is exposed was indicated by ○, a case in which the rubbing was performed 20 to 50 times was indicated by Δ, and a case in which the rubbing was performed less than 20 times was indicated by x. In Examples, it is possible to obtain an enhanced preservation stability, discharging characteristic, weather resistance, printing quality, and tolerance when a pigment, a dispersed resin, and a solvent within the scope of the claims are used. In Examples 16 to 30, a further enhanced tolerance is achieved by using a resin fine particle 1 as a resin fine particle. In Examples 21 to 26, an enhanced printing quality is achieved even on PVC by adjusting a solvent composition. On the other hand, in Comparative Examples 1 to 7, a dispersed resin is out of the scope of the claims and thus, a stability of an ink may not be maintained, and a discharging characteristic is poor. In Comparative Examples 8 to 13, a weather resistance is low since C.I. Pigment Yellow 150 is not used. In Comparative Examples 14 to 16, a printing quality deteriorates since a solvent composition is out of the scope of the claims. In this way, it is indicated that an ink satisfying all evaluation items, and having a quality withstanding practical use is not manufactured when the ink out of the scope of the invention.

TABLE 1

| Manufacturing Example | Dispersed resin | Reaction solvent | | | | Dripping mixture | | | | | | | | | | |
|---|---|---|---|---|---|---|---|---|---|---|---|---|---|---|---|---|
| | | MTG | HDG | BOD | Butanol | VA | VMA | STA | STMA | LMA | St | α-MeSt | BzA | BzMA | AA | MAA |
| Ex. 1 | 1 | 93.4 | | | | 35 | | | | | 35 | | | | 30 | |
| Ex. 2 | 2 | | | | 93.4 | 35 | | | | | 35 | | | | 30 | |
| Ex. 3 | 3 | 93.4 | | | | | 35 | | | | | 35 | | | 30 | |
| Ex. 4 | 4 | | 93.4 | | | 35 | | | | | | | 35 | | 30 | |
| Ex. 5 | 5 | | | 93.4 | | 35 | | | | | | | | 35 | 30 | |
| Ex. 6 | 6 | 93.4 | | | | 35 | | | | | 35 | | | | | 30 |
| Ex. 7 | 7 | 93.4 | | | | 47 | | | | | 47 | | | | 6 | |
| Ex. 8 | 8 | 93.4 | | | | 23 | | | | | 23 | | | | 54 | |
| Ex. 9 | 9 | 89 | | | | 35 | | | | | 35 | | | | 30 | |
| Ex. 10 | 10 | 98.35 | | | | 35 | | | | | 35 | | | | 30 | |
| Ex. 11 | 11 | 93.4 | | | | 20 | | | | | 50 | | | | 30 | |
| Ex. 12 | 12 | 93.4 | | | | 50 | | | | | 20 | | | | 30 | |
| Ex. 13 | 13 | 93.4 | | | | 40 | | | | | 20 | | | | 40 | |
| Ex. 14 | 14 | 93.4 | | | | | | 35 | | | 35 | | | | 30 | |
| Ex. 15 | 15 | 93.4 | | | | | | | 35 | | 35 | | | | 30 | |
| Ref. 1 | Ref. 1 | 93.4 | | | | 70 | | | | | | | | | 30 | |
| Ref. 2 | Ref. 2 | 93.4 | | | | | | | | | 70 | | | | 30 | |
| Ref. 3 | Ref. 3 | 93.4 | | | | | | | | 35 | 35 | | | | 30 | |
| Ref. 4 | Ref. 4 | 93.4 | | | | | | | | 47 | 47 | | | | 6 | |
| Ref. 5 | Ref. 5 | 93.4 | | | | | | | | 23 | 23 | | | | 54 | |
| Ref. 6 | Ref. 6 | 93.4 | | | | | | | | 50 | 20 | | | | 30 | |
| Ref. 7 | Ref. 7 | 93.4 | | | | | | | | 20 | 50 | | | | 30 | |

| Manufacturing Example | Dripping mixture | | 3 hours from completion of dripping | | Reaction temperature | Neutralization | | Final material | | |
|---|---|---|---|---|---|---|---|---|---|---|
| | V-601 | V-65 | V-601 | V-65 | | Neutralization percentage | DMAE | Non-volatile matter | Theoretical acid value | Mw |
| Ex. 1 | 6 | | 0.6 | | 110° C. | 100% | 37.1 | 20% | 234 | 16000 |
| Ex. 2 | 6 | | 0.6 | | 110° C. | 100% | 37.1 | 20% | 234 | 16000 |
| Ex. 3 | 6 | | 0.6 | | 110° C. | 100% | 37.1 | 20% | 234 | 16000 |
| Ex. 4 | 6 | | 0.6 | | 110° C. | 100% | 37.1 | 20% | 234 | 16000 |
| Ex. 5 | 6 | | 0.6 | | 110° C. | 100% | 37.1 | 20% | 234 | 16000 |
| Ex. 6 | 6 | | 0.6 | | 110° C. | 100% | 37.1 | 20% | 196 | 16000 |
| Ex. 7 | 6 | | 0.6 | | 110° C. | 100% | 7.4 | 20% | 47 | 16000 |
| Ex. 8 | 6 | | 0.6 | | 110° C. | 100% | 66.8 | 20% | 421 | 16000 |
| Ex. 9 | | 10 | | 1 | 130° C. | 100% | 37.1 | 20% | 234 | 1500 |
| Ex. 10 | 1.5 | | 0.15 | | 110° C. | 100% | 37.1 | 20% | 234 | 35000 |
| Ex. 11 | 6 | | 0.6 | | 110° C. | 100% | 37.1 | 20% | 234 | 16000 |
| Ex. 12 | 6 | | 0.6 | | 110° C. | 100% | 37.1 | 20% | 234 | 16000 |
| Ex. 13 | 6 | | 0.6 | | 110° C. | 100% | 49.5 | 20% | 312 | 16000 |

TABLE 1-continued

| | | | | | | | | |
|---|---|---|---|---|---|---|---|---|
| Ex. 14 | 6 | 0.6 | 110° C. | 100% | 37.1 | 20% | 234 | 16000 |
| Ex. 15 | 6 | 0.6 | 110° C. | 100% | 37.1 | 20% | 234 | 16000 |
| Ref. 1 | 6 | 0.6 | 110° C. | 100% | 37.1 | 20% | 234 | 16000 |
| Ref. 2 | 6 | 0.6 | 110° C. | 100% | 37.1 | 20% | 234 | 16000 |
| Ref. 3 | 6 | 0.6 | 110° C. | 100% | 37.1 | 20% | 234 | 16000 |
| Ref. 4 | 6 | 0.6 | 110° C. | 100% | 7.4 | 20% | 47 | 16000 |
| Ref. 5 | 6 | 0.6 | 110° C. | 100% | 66.8 | 20% | 421 | 16000 |
| Ref. 6 | 6 | 0.6 | 110° C. | 100% | 37.1 | 20% | 234 | 16000 |
| Ref. 7 | 6 | 0.6 | 110° C. | 100% | 37.1 | 20% | 234 | 16000 |

VA: Behenyl acrylate
VMA: Behenyl methacrylate
STA: Stearyl acrylate
STMA: Stearyl methacrylate
LMA: Lauryl acrylate
St: Styrene
α-MeSt: α-methyl styrene
BzA: Benzyl acrylate
BzMA: Benzyl methacrylate
AA: Acrylic acid
V-601: Radical polymerization initiator (manufacturing by WAKO PURE CHEMICAL INDUSTRIES, LTD.)
V-65: Radical polymerization initiator (manufacturing by WAKO PURE CHEMICAL INDUSTRIES, LTD.)
MTG: Triethylene glycol monomethyl ether
HDG: Diethylene glycol monohexyl ether
BDO: 1,2-butanediol

TABLE 2

| Example | Dispersed resin | Composition | Mw | Pigment Types | Dispersed element | MTG | BDG | HDG | DEDG | DMTeG | PDO | BDO | HDO |
|---|---|---|---|---|---|---|---|---|---|---|---|---|---|
| Ex. 1 | 1 | VA/St/AA = 35/35/30 | 16000 | Pigment Yellow 150 | 20% | 35% | 5% | | | | | | |
| Ex. 2 | 2 | ↑ | 16000 | Pigment Yellow 150 | 20% | 35% | 5% | | | | | | |
| Ex. 3 | 3 | VMA/α-MeSt/AA = 35/35/30 | 16000 | Pigment Yellow 150 | 20% | 35% | 5% | | | | | | |
| Ex. 4 | 4 | VA/BzA/AA = 35/35/30 | 16000 | Pigment Yellow 150 | 20% | 35% | 5% | | | | | | |
| Ex. 5 | 5 | VA/BzMA/AA = 35/35/30 | 16000 | Pigment Yellow 150 | 20% | 35% | 5% | | | | | | |
| Ex. 6 | 6 | VA/St/MAA = 35/35/30 | 16000 | Pigment Yellow 150 | 20% | 35% | 5% | | | | | | |
| Ex. 7 | 7 | VA/St/AA = 47/47/6 | 16000 | Pigment Yellow 150 | 20% | 35% | 5% | | | | | | |
| Ex. 8 | 8 | VA/St/AA = 23/23/54 | 16000 | Pigment Yellow 150 | 20% | 35% | 5% | | | | | | |
| Ex. 9 | 9 | VA/St/AA = 35/35/30 | 1500 | Pigment Yellow 150 | 20% | 35% | 5% | | | | | | |
| Ex. 10 | 10 | ↑ | 35000 | Pigment Yellow 150 | 20% | 35% | 5% | | | | | | |
| Ex. 11 | 11 | VA/St/AA = 20/50/30 | 16000 | Pigment Yellow 150 | 20% | 35% | 5% | | | | | | |
| Ex. 12 | 12 | VA/St/AA = 50/20/30 | 16000 | Pigment Yellow 150 | 20% | 35% | 5% | | | | | | |
| Ex. 13 | 13 | VA/St/AA = 40/20/40 | 16000 | Pigment Yellow 150 | 20% | 35% | 5% | | | | | | |
| Ex. 14 | 14 | STA/St/AA = 35/35/30 | 16000 | Pigment Yellow 150 | 20% | 35% | 5% | | | | | | |
| Ex. 15 | 15 | STMA/St/AA = 35/35/30 | 16000 | Pigment Yellow 150 | 20% | 35% | 5% | | | | | | |
| Ex. 16 | 1 | ↑ | 16000 | Pigment Yellow 150 | 20% | 35% | 5% | | | | | | |
| Ex. 17 | 13 | VA/St/AA = 40/20/40 | 16000 | Pigment Yellow 150 | 20% | 35% | 5% | | | | | | |
| Ex. 18 | 13 | ↑ | 16000 | Pigment Yellow 150 | 20% | | 40% | | | | | | |
| Ex. 19 | 13 | ↑ | 16000 | Pigment Yellow 150 | 20% | | 20% | | | | | 20% | |
| Ex. 20 | 13 | ↑ | 16000 | Pigment Yellow 150 | 20% | | | 10% | | | | 30% | |
| Ex. 21 | 13 | ↑ | 16000 | Pigment Yellow 150 | 20% | | | | 10% | | | 30% | |
| Ex. 22 | 13 | ↑ | 16000 | Pigment Yellow 150 | 20% | | | | | 20% | | 20% | |

TABLE 2-continued

| | | | | | | | | | | |
|---|---|---|---|---|---|---|---|---|---|---|
| Ex. 23 | 13 | ↑ | | 16000 | Pigment Yellow 150 | 20% | | | 10% | 25% | |
| Ex. 24 | 13 | ↑ | | 16000 | Pigment Yellow 150 | 20% | | | 10% | 20% | 5% |
| Ex. 25 | 13 | ↑ | | 16000 | Pigment Yellow 150 | 20% | 20% | 20% | | | |
| Ex. 26 | 13 | ↑ | | 16000 | Pigment Yellow 150 | 20% | 35% | | 5% | | |
| Ex. 27 | 13 | ↑ | | 16000 | Pigment Yellow 150 | 20% | 35% | | | 5% | |
| Ex. 28 | 13 | ↑ | | 16000 | Pigment Yellow 150 | 20% | | 5% | 35% | | |
| Ex. 29 | 13 | ↑ | | 16000 | Pigment Yellow 150 | 20% | 40% | | | | |
| Ex. 30 | 13 | ↑ | | 16000 | Pigment Yellow 150 | 20% | 35% | | | 5% | |
| Ex. 31 | 13 | ↑ | | 16000 | Pigment Yellow 150 | 20% | 30% | | | | |
| Ref. Ex. 1 | Ref. 1 | VA/AA = 70/30 | | 16000 | Pigment Yellow 150 | 20% | 35% | 5% | | | |
| Ref. Ex. 2 | Ref. 2 | St/AA = 70/30 | | 16000 | Pigment Yellow 150 | 20% | 35% | 5% | | | |
| Ref. Ex. 3 | Ref. 3 | LMA/St/AA = 35/35/30 | | 16000 | Pigment Yellow 150 | 20% | 35% | 5% | | | |
| Ref. Ex. 4 | Ref. 4 | LMA/St/AA = 47/47/6 | | 16000 | Pigment Yellow 150 | 20% | 35% | 5% | | | |
| Ref. Ex. 5 | Ref. 5 | LMA/St/AA = 23/23/54 | | 16000 | Pigment Yellow 150 | 20% | 35% | 5% | | | |
| Ref. Ex. 6 | Ref. 6 | LMA/St/AA = 50/20/30 | | 16000 | Pigment Yellow 150 | 20% | 35% | 5% | | | |
| Ref. Ex. 7 | Ref. 7 | LMA/St/AA = 20/50/30 | | 16000 | Pigment Yellow 150 | 20% | 35% | 5% | | | |
| Ref. Ex. 8 | 1 | VA/St/AA = /40/20/40 | | 16000 | Pigment Yellow 74 | 20% | 35% | 5% | | | |
| Ref. Ex. 9 | 1 | ↑ | | 16000 | Pigment Yellow 120 | 20% | 35% | 5% | | | |
| Ref. Ex. 10 | 1 | ↑ | | 16000 | Pigment Yellow 151 | 20% | 35% | 5% | | | |
| Ref. Ex. 11 | 1 | ↑ | | 16000 | Pigment Yellow 155 | 20% | 35% | 5% | | | |
| Ref. Ex. 12 | 1 | ↑ | | 16000 | Pigment Yellow 180 | 20% | 35% | 5% | | | |
| Ref. Ex. 13 | 1 | ↑ | | 16000 | Pigment Yellow 185 | 20% | 35% | 5% | | | |
| Ref. Ex. 14 | 1 | ↑ | | 16000 | Pigment Yellow 150 | 20% | | | | | |
| Ref. Ex. 15 | 1 | ↑ | | 16000 | Pigment Yellow 150 | 20% | | | | | |
| Ref. Ex. 16 | 1 | ↑ | | 16000 | Pigment Yellow 150 | 20% | | | | | |

| | Manufacture of ink | | | | Preservation | | Weather | Printing quality | Printing quality | Tolerance |
|---|---|---|---|---|---|---|---|---|---|---|
| Example | 2PY | Gly | Fixing resin 1 | Water | stability | Discharging | resistance | (Coated paper) | (PVC) | test |
| Ex. 1 | | | | 40.0% | B | ○ | ○ | ○ | Δ | Δ |
| Ex. 2 | | | | 40.0% | B | ○ | ○ | ○ | Δ | Δ |
| Ex. 3 | | | | 40.0% | B | ○ | ○ | ○ | Δ | Δ |
| Ex. 4 | | | | 40.0% | B | ○ | ○ | ○ | Δ | Δ |
| Ex. 5 | | | | 40.0% | B | ○ | ○ | ○ | Δ | Δ |
| Ex. 6 | | | | 40.0% | B | ○ | ○ | ○ | Δ | Δ |
| Ex. 7 | | | | 40.0% | C | Δ | ○ | ○ | Δ | Δ |
| Ex. 8 | | | | 40.0% | C | ○ | ○ | ○ | Δ | Δ |
| Ex. 9 | | | | 40.0% | C | ○ | ○ | ○ | Δ | Δ |
| Ex. 10 | | | | 40.0% | C | Δ | ○ | ○ | Δ | Δ |
| Ex. 11 | | | | 40.0% | C | ○ | ○ | ○ | Δ | Δ |
| Ex. 12 | | | | 40.0% | A | ○ | ○ | ○ | Δ | Δ |
| Ex. 13 | | | | 40.0% | A | ○ | ○ | ○ | Δ | Δ |
| Ex. 14 | | | | 40.0% | C | ○ | ○ | ○ | Δ | Δ |
| Ex. 15 | | | | 40.0% | C | ○ | ○ | ○ | Δ | Δ |
| Ex. 16 | | | 20% | 20.0% | C | ○ | ○ | ○ | Δ | ○ |
| Ex. 17 | | | 20% | 20.0% | B | ○ | ○ | ○ | Δ | ○ |
| Ex. 18 | | | 20% | 20.0% | C | ○ | ○ | ⊙ | ⊙ | ○ |
| Ex. 19 | | | 20% | 20.0% | B | ○ | ○ | ⊙ | ⊙ | ○ |
| Ex. 20 | | | 20% | 20.0% | B | ○ | ○ | ⊙ | ⊙ | ○ |
| Ex. 21 | | | 20% | 20.0% | B | ○ | ○ | ⊙ | ⊙ | ○ |
| Ex. 22 | | | 20% | 20.0% | B | ○ | ○ | ⊙ | ⊙ | ○ |
| Ex. 23 | 5% | | 20% | 20.0% | A | ○ | ○ | ⊙ | ⊙ | ○ |
| Ex. 24 | 5% | | 20% | 20.0% | A | ○ | ○ | ⊙ | ⊙ | ○ |
| Ex. 25 | | | 20% | 20.0% | B | ○ | ○ | ⊙ | ○ | ○ |

TABLE 2-continued

| | | | | | | | | | | |
|---|---|---|---|---|---|---|---|---|---|---|
| Ex. 26 | | 20% | 20.0% | A | ○ | ○ | ⊙ | ○ | ○ | |
| Ex. 27 | | 20% | 20.0% | A | ○ | ○ | ○ | Δ | ○ | |
| Ex. 28 | | 20% | 20.0% | A | ○ | ○ | ○ | Δ | ○ | |
| Ex. 29 | | 20% | 20.0% | A | ○ | ○ | Δ | Δ | ○ | |
| Ex. 30 | | 20% | 20.0% | A | ○ | ○ | Δ | Δ | ○ | |
| Ex. 31 | 10% | 20% | 20.0% | A | ○ | ○ | Δ | Δ | ○ | |
| Ref. Ex. 1 | | | 40.0% | D | X | ○ | ○ | Δ | Δ | |
| Ref. Ex. 2 | | | 40.0% | E | X | ○ | ○ | Δ | X | |
| Ref. Ex. 3 | | | 40.0% | E | X | ○ | ○ | Δ | X | |
| Ref. Ex. 4 | | | 40.0% | E | X | ○ | ○ | Δ | X | |
| Ref. Ex. 5 | | | 40.0% | E | X | ○ | ○ | Δ | X | |
| Ref. Ex. 6 | | | 40.0% | D | X | ○ | ○ | Δ | X | |
| Ref. Ex. 7 | | | 40.0% | E | X | ○ | ○ | Δ | X | |
| Ref. Ex. 8 | | | 40.0% | B | ○ | X | ○ | Δ | Δ | |
| Ref. Ex. 9 | | | 40.0% | B | ○ | X | ○ | Δ | Δ | |
| Ref. Ex. 10 | | | 40.0% | C | ○ | X | ○ | Δ | Δ | |
| Ref. Ex. 11 | | | 40.0% | C | ○ | X | ○ | Δ | Δ | |
| Ref. Ex. 12 | | | 40.0% | C | ○ | X | ○ | Δ | Δ | |
| Ref. Ex. 13 | | | 40.0% | D | X | X | ○ | Δ | Δ | |
| Ref. Ex. 14 | 30% | | 50.0% | A | X | ○ | X | X | Δ | |
| Ref. Ex. 15 | | 30% | 50.0% | A | X | ○ | X | X | Δ | |
| Ref. Ex. 16 | 20% | 10% | 50.0% | A | X | ○ | X | X | Δ | |

MTG: Triethylene glycol monomethyl ether
BDG: Diethylene glycol monobutyl ether
HDG: Diethylene glycol monohexyl ether
PDO: 1,2-propanediol
BDO: 1,2-butanediol
HDO: 1,2-hexanediol
2PY: 2-pyrrolidone
Gly: Glycerin

The invention claimed is:

1. An inkjet pigment ink, comprising:
   C.I. Pigment Red 122;
   a water-soluble solvent selected from the group consisting of a glycol ether and a diol;
   water; and
   a pigment dispersing resin which is copolymer consisting essentially of a monomer A, a monomer B, and a monomer C as unit components,
   wherein the C.I. Pigment Red 122 is a pigment subject to a hydrophilic treatment and has a transmittance of less than 70%, and
   wherein:
   the transmittance is a transmittance of an aqueous layer measured by a turbidimeter when a 1.00% by weight pigment is added to water, is shaken, and is left for an hour, and then the aqueous layer is collected, and is measured in a 50 mm angular cell;
   the monomer A is an alkyl (meth)acrylate ester having a C18-C24 alkyl group;
   the monomer B is styrene, α-methyl styrene, or benzyl (meth)acrylate; and
   the monomer C is (meth)acrylic acid.

2. The inkjet pigment ink according to claim 1, wherein an acid value of the pigment dispersing resin is 50 mgKOH/g or more and 400 mgKOH/g or less.

3. The inkjet pigment ink according to claim 1, wherein the monomer A is selected from the group consisting of stearyl (meth)acrylate and behenyl (meth)acrylate.

4. The inkjet pigment ink according to claim 1, wherein the monomer B is styrene.

5. The inkjet pigment ink according to claim 1, wherein an adsorption rate of a dispersant with respect to the pigment is 10% or more when a dispersing element comprising the pigment, the dispersant and the solvent has a pigment/dispersed resin (non-volatile matter) ratio of 4/1.

6. The inkjet pigment ink according to claim 1, wherein the glycol ether is selected from the group consisting of a (poly)alkylene glycol monoalkyl ether and a (poly)alkylene glycol dialkyl ether.

7. The inkjet pigment ink according to claim 1, wherein the diol is selected from a C3-C6 alkanediol.

8. The inkjet pigment ink according to claim 1, which comprises an aqueous emulsion.

9. An ink set of yellow, magenta, cyan, and black inks, which comprises the inkjet pigment ink according to claim 1.

10. A printed material, which is printed with the inkjet pigment ink according to claim 1.

11. An inkjet pigment ink, which comprises:
   C.I. Pigment Red 269;
   a water-soluble solvent selected from the group consisting of a glycol ether and a diol;
   water; and
   a pigment dispersing resin being a copolymer consisting essentially of a monomer A, a monomer B, and a monomer C as unit components;

wherein the C.I. Pigment Red 269 has a transmittance of less than 70%, and wherein the transmittance is a transmittance of an aqueous layer measured by a turbidimeter when a 1.00% by weight pigment is added to water, is shaken, and is left for an hour, and then the aqueous layer is collected, and is measured in a 50 mm angular cell, and the monomer A is an alkyl (meth)acrylate ester having a C18-C24 alkyl group, the monomer B is styrene, α-methyl styrene, or benzyl (meth)acrylate, and the monomer C is (meth)acrylic acid.

12. The inkjet pigment ink according to claim 11, wherein an acid value of the pigment dispersing resin is 50 mgKOH/g or more and 400 mgKOH/g or less.

13. The inkjet pigment ink according to claim 11, wherein the monomer A is selected from the group consisting of stearyl (meth)acrylate, and behenyl (meth)acrylate.

14. The inkjet pigment ink according to claim 11, wherein the monomer B is styrene.

15. The inkjet pigment ink according to claim 11, wherein an adsorption rate of a dispersant with respect to the pigment is 10% or more when a dispersing element comprising the pigment, the dispersant, and the solvent has a pigment/dispersed resin (non-volatile matter) ratio of 7/3.

16. The inkjet pigment ink according to claim 11, wherein the glycol ethers is selected from the group consisting of a (poly)alkylene glycol monoalkyl ether and a (poly)alkylene glycol dialkyl ether.

17. The inkjet pigment ink according to claim 11, wherein the diols is selected from a C3-C6 alkanediol.

18. The inkjet pigment ink according to claim 11, which comprises an aqueous emulsion.

19. An ink set of yellow, magenta, cyan, and black inks, which comprises the inkjet pigment ink according to claim 11.

20. A printed material, which is printed with the inkjet pigment ink according to claim 11.

* * * * *